(12) United States Patent
Menezo et al.

(10) Patent No.: US 8,189,200 B2
(45) Date of Patent: May 29, 2012

(54) FIBER OPTIC INTERFEROMETRIC SENSOR ARRAY WITH INCREASED MULTIPLEXING DENSITY

(75) Inventors: Sylvie Menezo, Bourg-les-Valence (FR); Isabelle Sellin, Vigneux de Bretagne (FR)

(73) Assignee: Sercel, Carquefou (FR)

( * ) Notice: Subject to any disclaimer, the term of this patent is extended or adjusted under 35 U.S.C. 154(b) by 431 days.

(21) Appl. No.: 12/476,568

(22) Filed: Jun. 2, 2009

(65) Prior Publication Data

US 2010/0302549 A1    Dec. 2, 2010

(30) Foreign Application Priority Data

Jun. 4, 2008   (EP) .................................. 08305231.6

(51) Int. Cl.
*G01B 9/02*  (2006.01)
(52) U.S. Cl. ........................................................ 356/478
(58) Field of Classification Search .................. 356/478
See application file for complete search history.

(56) References Cited

U.S. PATENT DOCUMENTS

| | | | |
|---|---|---|---|
| 5,696,857 A | 12/1997 | Frederick | |
| 5,959,294 A | 9/1999 | Green et al. | |
| 5,991,026 A * | 11/1999 | Kluth et al. | ................... 356/478 |
| 7,154,082 B2 | 12/2006 | Maas | |
| 2007/0024857 A1 | 2/2007 | Menezo | |
| 2007/0258319 A1* | 11/2007 | Ronnekleiv et al. | ............ 367/20 |

FOREIGN PATENT DOCUMENTS

| | | |
|---|---|---|
| GB | 2 340 227 A | 2/2000 |
| WO | WO 00/62021 A1 | 10/2000 |
| WO | WO 2007/045028 A1 | 4/2007 |

OTHER PUBLICATIONS

Crickmore et al., "Remotely pumped and interrogated 96 channel fibre-optic hydrophone array," *Optical Fiber Sensor Conference 16*, pp. 760-763, Nov. 2003.

Brooks et al., "Fiber-optic interferometric sensor arrays with freedom from source phase-induced noise," *Optics Letters*, vol. 11, No. 7, pp. 473-475, Jul. 1986.

* cited by examiner

*Primary Examiner* — Tarifur Chowdhury
*Assistant Examiner* — Jonathon Cook
(74) *Attorney, Agent, or Firm* — Foley & Lardner LLP

(57) ABSTRACT

An apparatus and a method for multiplexing and demultiplexing Fiber Optic Interferometric Sensors (FOISs), including means for forming an optical source, at least one sensing cable, at least one wavelength demultiplexing system, and a calibration system.

35 Claims, 17 Drawing Sheets

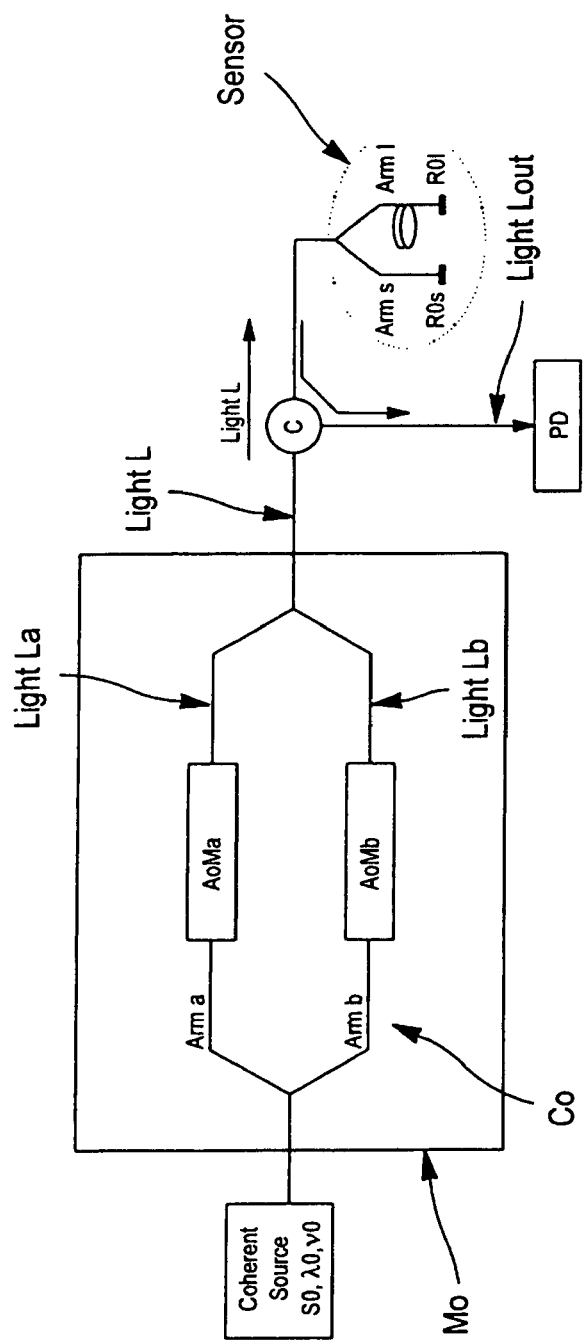
FIG. 1
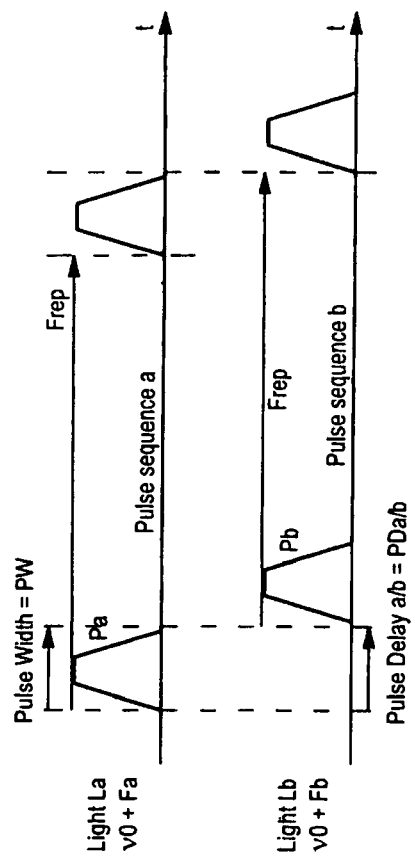
FIG. 2a
FIG. 2b

FIBER OPTIC INTERFEROMETRIC SENSOR ARRAY WITH INCREASED MULTIPLEXING DENSITY

CROSS-REFERENCE TO RELATED APPLICATION

The present application claims priority to EP08305231.6, filed on Jun. 4, 2008 in France.

The invention is related to a Fiber Optic Interferometric Sensors (FOIS) array.

The invention is also related to an apparatus for multiplexing/demultiplexing a Fiber Optic Interferometric Sensors (FOIS) array, and to a method for multiplexing/demultiplexing a FOIS array.

The invention can be dedicated to seismic sensing applications where the sensor arrays are made of several receiver points located at different places; each receiver point may contain several sensors.

Nevertheless, the invention is not limited to seismic sensing applications and can be dedicated to any sensing applications involving an array of FOISs spread into groups of sensors.

For seismic applications such as <<Deep Ocean Bottom Cable>> (DOBC), the arrays are made of several Receiver Points (RP), called nodes, distinct one from another and geographically spaced by a given distance. Each node comprises four sensors geographically located at the same point: the four sensors, one hydrophone and three geophones, form a Receiver Point or measurement node. The X-talk level required between the four sensors is very low.

Some external perturbations applied on an optical fiber length (pressure variations, temperature variations, vibrations, . . . ) cause the fiber length and index of refraction to change, leading to a change of the time propagation (or phase) of the light field propagating in the fiber. A FOIS is commonly made of two fibers: at its entrance, the light is divided into two optical fields:
- the optical field propagating in a fiber length submitted to the perturbation to measure (an acoustic signal for example): this fiber length forms the sensing part of the FOIS,
- the optical field propagating in a fiber length isolated from the perturbation: this fiber forms the reference fiber of the FOIS.

When the FOIS is submitted to an external perturbation, the difference in time propagation, through the FOIS, of the two optical fields will change. This change in time propagation (or phase) difference is representative of the external perturbation applied on the sensing part of the FOIS.

A FOIS interrogating system ensures the reading of the phase difference between two optical fields. It is made of an optical source providing the light, a telemetry fiber bringing the light to the FOIS, a return fiber bringing the light from the FOIS to a photo-detector on which the combination of the two optical fields leads to an interferometric signal bearing the information on the phase difference between the two optical fields, and an electronic demodulation system computing the phase difference from the photo-detector output interferometric signal.

In some applications, the sensors involved in an array can be as many as a few thousands. The decision to go for such arrays mainly depends on their cost and reliability.

In a FOIS array, the interrogating system is ideally shared between several FOIS so as to reduce the array cost: the optical source, the telemetry and return fibers, the photo-detector, and the electronic demodulation system can interrogate many FOISs. A FOIS array is thus made of one or more optical sources, of which light is guided to a group of FOISs. Each FOIS locally brings its information on the optical field that goes through it. The return fiber brings the modified optical fields to one or more photo-detectors. The interferometric signals from the different FOISs then need to be separated or demultiplexed. Demultiplexing of the interferometric signals is achieved by:
- separating the electrical interferometric signals bearing the response of one FOIS and generated on the photo receiver in the time domain, through pulse gating schemes (Time Division Multiplexing or TDM); or
- separating the optical fields bearing the response of one FOIS (or of a group of FOIS) before the photo-detector array in the optical field wavelength domain, through optical wavelength filters (Wavelength Division Multiplexing or WDM); or
- separating the electrical interferometric signals bearing the response of one FOIS (or of a group of FOIS) and generated on the photo receiver in the frequency domain, through RF frequency filters (Frequency Division Multiplexing or FDM).

As an example, the document <<Fiber interferometric sensor arrays with freedom from source phase induced noise>> in <<Optics Letters>>, vol. 11, July 1986, n°7, pp. 473-475 (D1) presents a Time Division Multiplexing Technique. Detailed descriptions of the TDM and WDM techniques are, for example, disclosed in the patent application US 2007/0024857 (D1). The U.S. Pat. No. 5,959,294 (D3) discloses a method and apparatus for the interrogation of fiber optic interferometric sensors based on a FDM technique.

The combination of WDM and TDM techniques allows to increase the number of sensors in a network. The document "Remotely pumped and interrogated 96 channel fiber optic hydrophone array, in "Optical Fiber Sensor Conference 16", pp. 760-763, November 2003" (D2) deals with a WDM-TDM combined technique. One can also mention the patent application US 2007/0024857 (D4), (improvement of the device disclosed in D2) which allows to get rid of the fabrication constraints to add fiber sections of accurate length in between each Fiber Optic Interferometric Sensor (FOIS) to interrogate (whether the sensors are located at the same node or not), and also allows to keep X-talk and reliability performances. Indeed, seismic applications require that the sensors are located at specific places in the array. Also ease of fabrication of the array, reliability and low X-talk between sensors are great benefits.

A WDM/FDM combined is proposed in the U.S. Pat. No. 7,154,082 (D5) patent.

Table 1a here below summarizes the multiplexing performances density of previous art solutions, in terms of:
1) Number (Nb) of multiplexed sensors on a single cable,
2) Number (Nb) of fiber buses per cable,
3) Number (Nb) of multiplexed sensors on a single Photo Detector (PD).

TABLE 1a

| Multiplexing Techniques | Nb of multiplexed sensors/cable (1) | Nb of fiber buses/cable (2) | Nb of multiplexed sensors/PD (3) |
|---|---|---|---|
| TDM & WDM (D3) | $n_\lambda \times n_{TDM/\lambda}$ | $n_\lambda$ | $n_{TDM/\lambda}$ |

Nb of wavelength ($\lambda$) used by the system = $n_\lambda$
Nb of TDM channels per wavelength ($\lambda$) = $n_{TDM/\lambda}$ TABLE 1a-continued

| Multiplexing Techniques | Nb of multiplexed sensors/cable (1) | Nb of fiber buses/cable (2) | Nb of multiplexed sensors/PD (3) |
|---|---|---|---|
| WDM & FDM (D4) Nb of wavelength (λ) used by the system = $n_\lambda$ Nb of FDM channels per wavelength (λ) = $n_{FDM/\lambda}$ | $n_\lambda \times n_{FDM/\lambda}$ | $n_{FDM/\lambda}$ | $n_{FDM/\lambda}$ |

It would be an important improvement from the prior art to provide a multiplexing technique in order to:
  reduce the number of fiber buses required to interrogate a given number of sensors,
  increase the number of sensors multiplexed onto a single photo-detector (PD).

Indeed, the reduction of the number of fiber buses for a given number of sensors multiplexed onto the cable implies cost reduction and enhanced reliability of the apparatus because less fiber connectors are used. And the increase of the number of sensors multiplexed onto a single photo-detector implies cost and size reduction as less photo-detectors and less demodulation chains are required.

Accordingly, the invention aims at providing a new multiplexing technique which enables to achieve these improvements, thanks to an apparatus and a method for multiplexing and demultiplexing Fiber Optic Interferometric Sensors (FOISs).

More precisely, this aim is achieved thanks to an apparatus for multiplexing and demultiplexing Fiber Optic Interferometric Sensors (FOISs), said apparatus comprising:
  means forming an optical source for providing l×n distinct trio ($v_{qj}$, $F_j$, $\tau_j$) for the interferometric interrogation of l×n×m sensors, where for $1 \leq j \leq p$:
    $v_{qj}$ is the frequency of an optical source,
    $F_j$ is a RF frequency carrier generated upon the lights of the n/p emitters emitting at the frequency $v_{qj}$ ($1 \leq q \leq n/p$), and
    $\tau_j$ is a time window where the light of the n/p emitters are on,
  at least one sensing cable comprising n groups of m fiber optic interferometric sensors each, and means for dedicating a unique given trio ($v_{qj}$, $F_j$, $\tau_j$, where $1 \leq q \leq n/p$ and $1 \leq j \leq p$) to the interrogation of a unique group of m fiber optic interferometric sensors;
  at least one wavelength demultiplexing system for separating the n wavelengths $v_{qj}$ ($1 \leq q \leq n/p$ and $1 \leq j \leq p$) into n/p outputs containing respectively the lights of wavelength bands $B_q$ for $1 \leq q \leq n/p$, where $B_q$ contains the p wavelengths $v_{qj}$ for $1 \leq j \leq p$,
  each output having at least one photo-detector followed by one demodulator scheme receiving the interference signals of at least two groups of m fiber optic interferometric sensors each and born by the carrier frequencies Fj for a given group of sensors;
  a calibration system for determining the absolute time footprints of the interference signals of said at least two groups of m fiber optic interferometric on the $q^{th}$ photo-detector.

The apparatus of the invention also comprises at least one of the following features:
  The means forming an optical source comprise:
    n optical emitters organized in p groups of n/p optical emitters each, for providing the n lights of distinct frequencies $v_{qj}$ ($1 \leq j \leq p$; $1 \leq q \leq n/p$);
    p wavelength multiplexers, each being associated with one group of n/p optical emitters respectively;
    p means following the wavelength multiplexers, for pulsing the light of the n/p emitters of said group of n/p emitters during the time window τj and generating the RF carrier frequency Fj upon the lights of the n/p emitters, so that each of these p means generates a couple of light pulses, delayed one from the other by a pulse delay.

The means forming an optical source also comprise means for successively switching on/off the p groups of n/p optical emitters.

Each of the p means generating a couple of light pulses, delayed one from the other by said pulse delay consists of two Acousto Optical Modulators (AOMs) of different shift frequencies $F_{ja}$ and $F_{jb}$ and combined with two optical couplers, each AOM allowing to shift the frequency and to pulse the amplitude of the light that goes through it, the light pulses pulse being time delayed by a said pulse delay and carrying each n/p frequencies $v_{qj}$+$F_{ja}$, $v_{qj}$+$F_{jb}$ for $1 \leq q \leq n/p$ respectively.

The means for dedicating a unique given trio ($v_{qj}$, $F_j$, $\tau_j$) to the interrogation of a unique group of m fiber optic interferometric sensors are means for dropping the wavelength $v_{qj}$ to a respective group of sensors, and passing the other remaining wavelengths.

The dropping means are distributed along a fiber and spaced one from another by fiber optic sections of any length.

Each group of m fiber optic interferometric sensors, comprises m fiber optic couplers of type 1 input towards 2 outputs disposed in series along a main fiber, of which one output is coupled to a respective fiber optic interferometric sensor.

The fiber optic couplers are spaced one from another by fiber optic sections of identical length so that the round trip path imbalance between two successive fiber optic couplers along the main fiber is identical and equal to D".

Two successive fiber optic couplers are arranged along the main fiber in such a way that the path imbalance D" is close to twice said pulse delay;

Two successive fiber optic couplers are arranged along the main fiber in such a way that the path imbalance D" is close to said pulse delay.

Each fiber optic interferometric sensor comprises a fiber optic coupler of type 1 input towards two outputs, which input is connected to one of the outputs of the respective fiber optic coupler of the main fiber, the first output of the fiber optic coupler being ended by a first mirror and its second output being ended by a second mirror, the fiber optic portion between the output of the fiber optic coupler and the second mirror also comprising a compliant body.

For each group of m fiber optic interferometric sensors, the short optical arm of each of the m sensors corresponds to the optical path between the input of the fiber optic coupler and the first mirror, and the long optical arm associated with each of the m sensors corresponds to the optical path between the input of the fiber optic coupler and the second mirror, the round trip path imbalance between the short and long optical arms being very close to said pulse delay.

The round trip path imbalance between the short and long optical arms of at least one fiber optic interferometric sensor is generated by the compliant body of the sensor itself.

Each of the 2*m mirrors of one group of sensors is a Fiber Bragg Grating selectively reflecting the frequency $v_{qj}$.

Each of the 2*m mirrors of one group of fiber optic interferometric sensors are not selective in wavelength, and are gold mirrors for example.

The fiber optic interferometers forming the sensors are Michelson interferometers or Fabry-Perot interferometers.

The apparatus is capable of interrogating I sub arrays, each made up of n groups of m fiber optic interferometric sensors and coupled by an optical coupling means to the means forming the optical source.

This aim is also achieved thanks to a method for multiplexing and demultiplexing Fiber Optic Interferometric Sensors (FOISs), said method comprising the following steps:

generating l×n distinct trio ($v_{qj}$, $F_j$, $\tau_j$) for the interferometric interrogation of at least one sensing cable comprising n groups of m fiber optic interferometric sensors each, where for $1 \leq j \leq p$:

$v_{qj}$ is the frequency of an optical source, $F_j$ is a RF frequency carrier generated upon the lights of the n/p emitters emitting at the frequency $v_{qj}$ for $1 \leq q \leq n/p$, and $\tau_j$ is a time window where the light of the n/p emitters are on, dedicating a unique given trio ($v_{qj}$, $F_j$, $\tau_j$) to the interrogation of a unique group of m fiber optic interferometric sensors;

receiving the response of at least two groups of m fiber optic interferometric sensors on one photo-detector;

determining the absolute time foot-prints of the response of said at least two groups of m fiber optic interferometric on the $q^{th}$ photo-detector.

The method according to the present invention can also comprise an additional step where, the n optical sources being organized in p groups of n/p optical emitters each, one switches on successively the p groups of n/p emitters to successively determine the absolute time foot prints of the response of the groups of m fiber optic interferometric on the demultiplexing system.

Other characteristics, objectives and advantages of the present invention will become apparent in the following detailed description illustrated by the appended figures, given as non restrictive examples and among which:

FIG. 1 shows a scheme of a system for the interrogation of one fiber optic interferometric sensor (FOIS);

FIG. 2a is a representation of the light La in the telemetry fiber at the outlet of the first arm a of the interferometer that is required to interrogate the FOIS; this light is made up of one light pulse Pa, which has a specific frequency v0+Fa, the pulse being periodically generated at a repetition frequency $F_{rep}$;

FIG. 2b is a representation of the light Lb in the telemetry fiber at the outlet of a second arm b of the interferometer that is required to interrogate the FOIS; this light is made up of one light pulse Pb, which has a specific frequency v0+Fb, where Fb is different from Fa (and more specifically in that case Fb>Fa), the pulse being periodically generated at a repetition frequency $F_{rep}$;

Figure 2C:
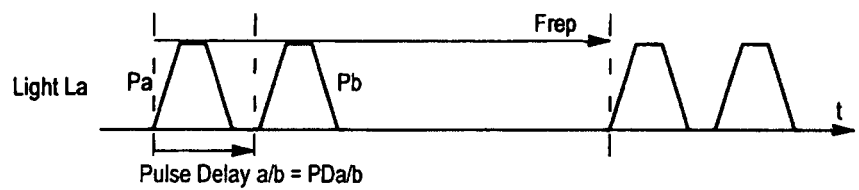
FIG. 2c is a representation of the light L in the telemetry fiber at the outlet of the interferometer that is required to interrogate the FOIS; this light is made up of light pulses Pa and Pb.
Figure 2D:
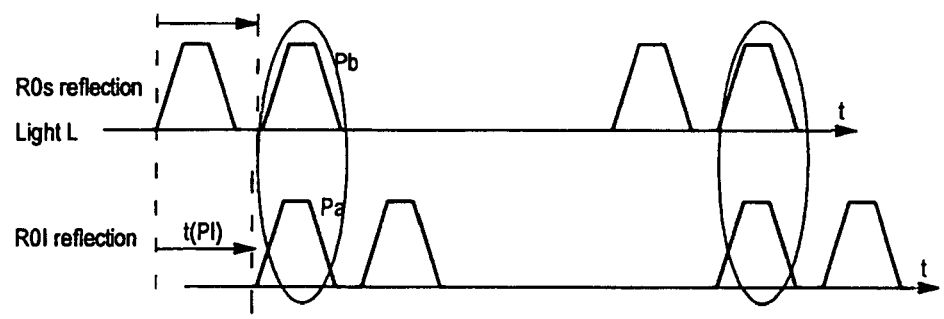
FIG. 2d is a representation of the light Lout formed of 2 couples of light pulses resulting from the couple (Pa, Pb) of light pulses represented at FIG. 2c, at the outlet of the FOIS.
Figure 3:
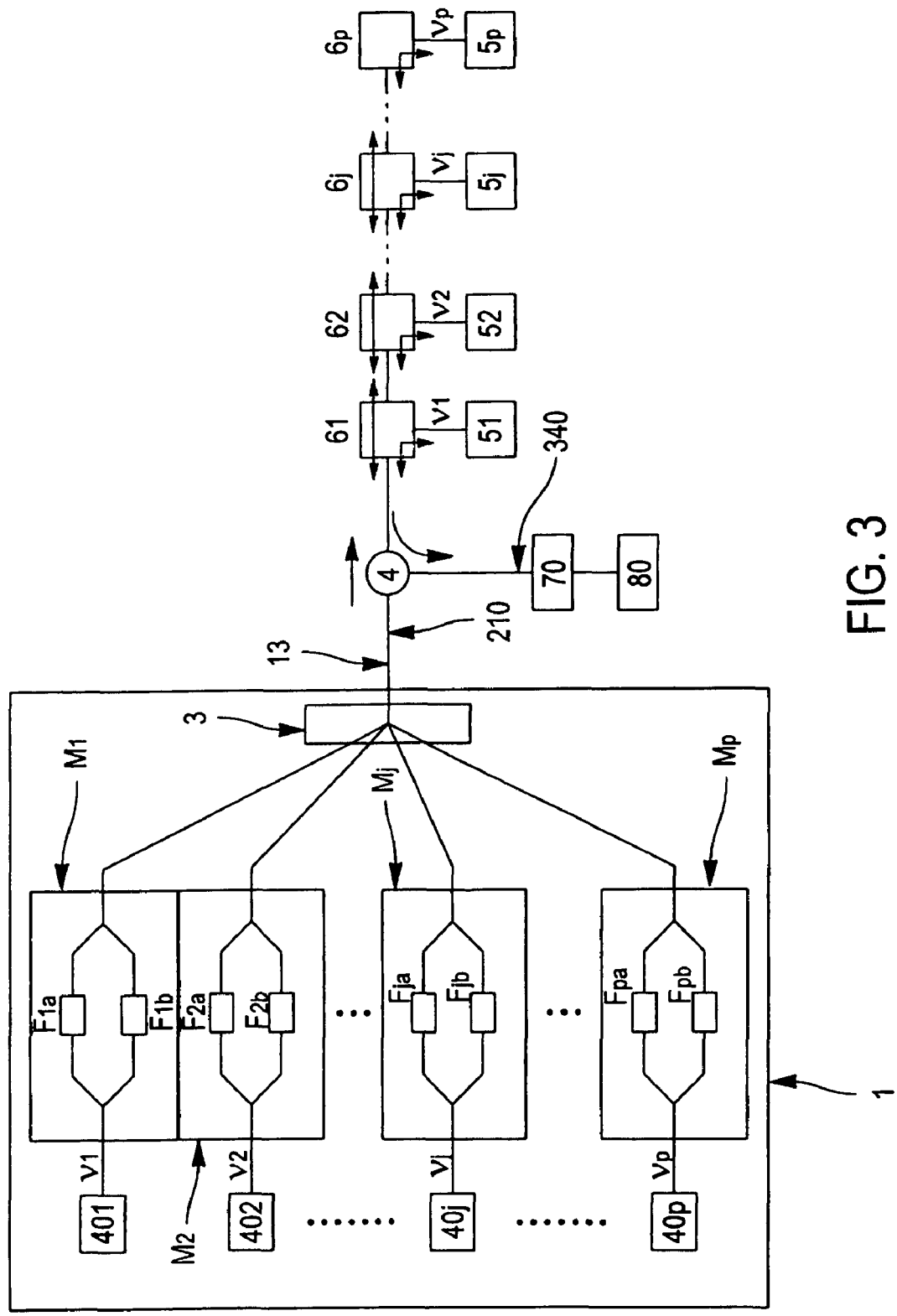
Figure 4A:
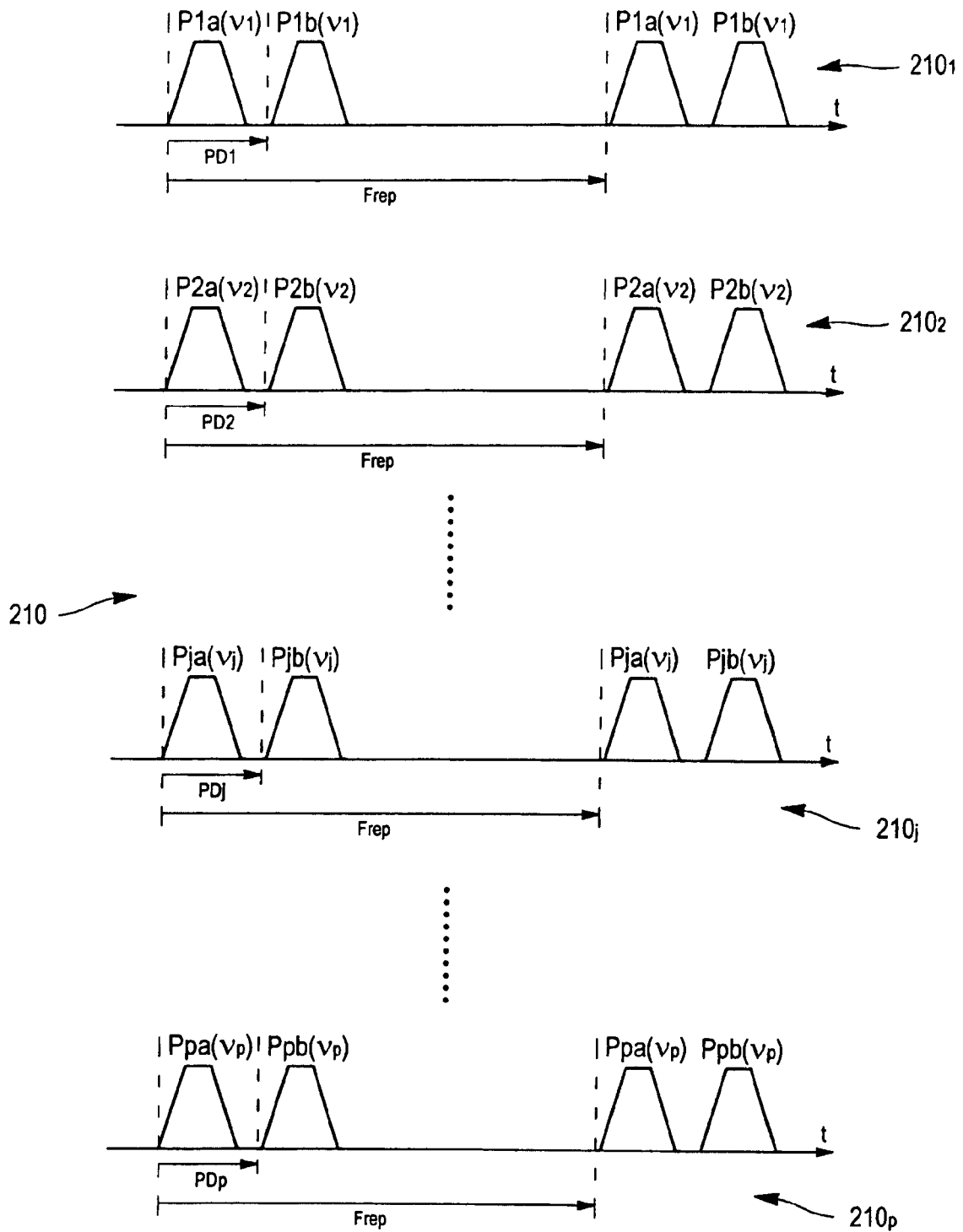
Figure 4B:
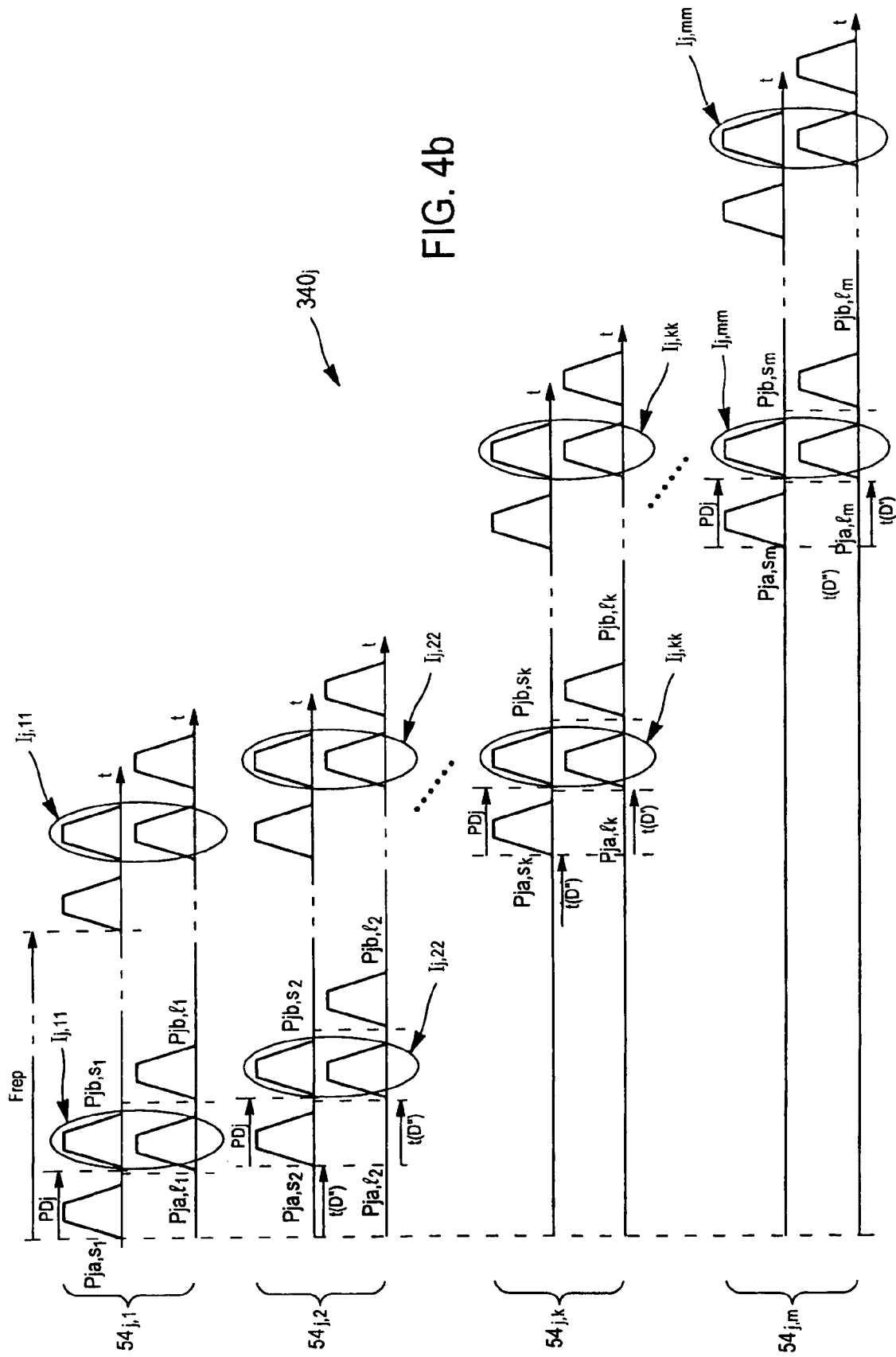
Figure 4C:
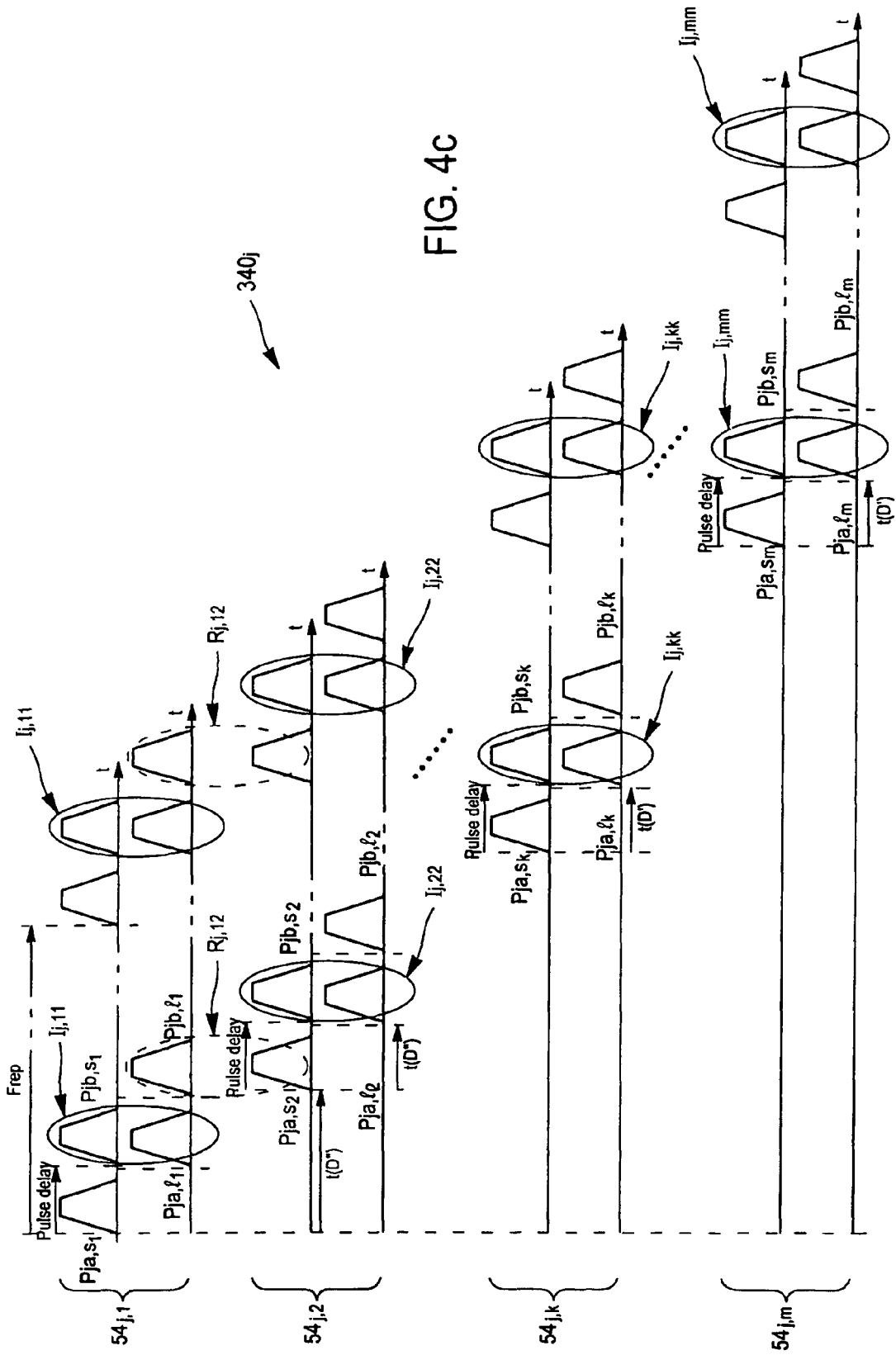
Figure 4D:
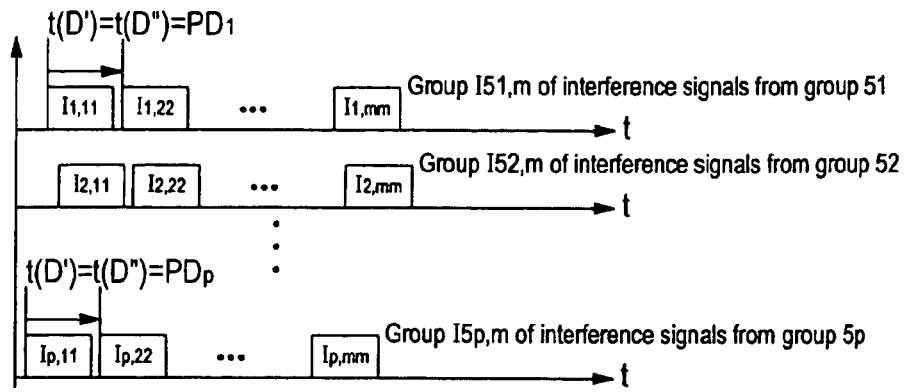
Figure 4E:
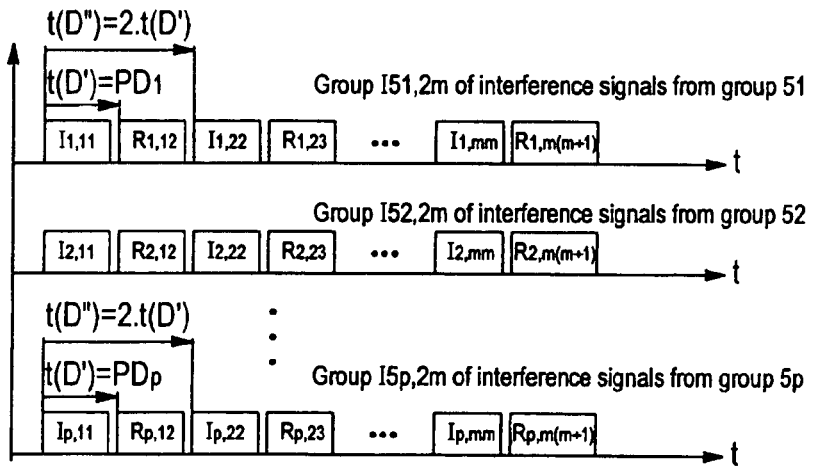
Figure 4F:
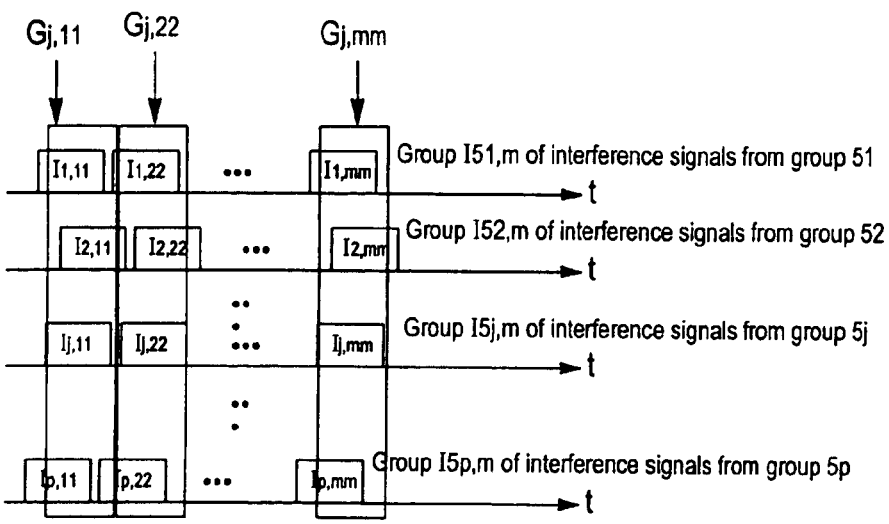
Figure 5A:
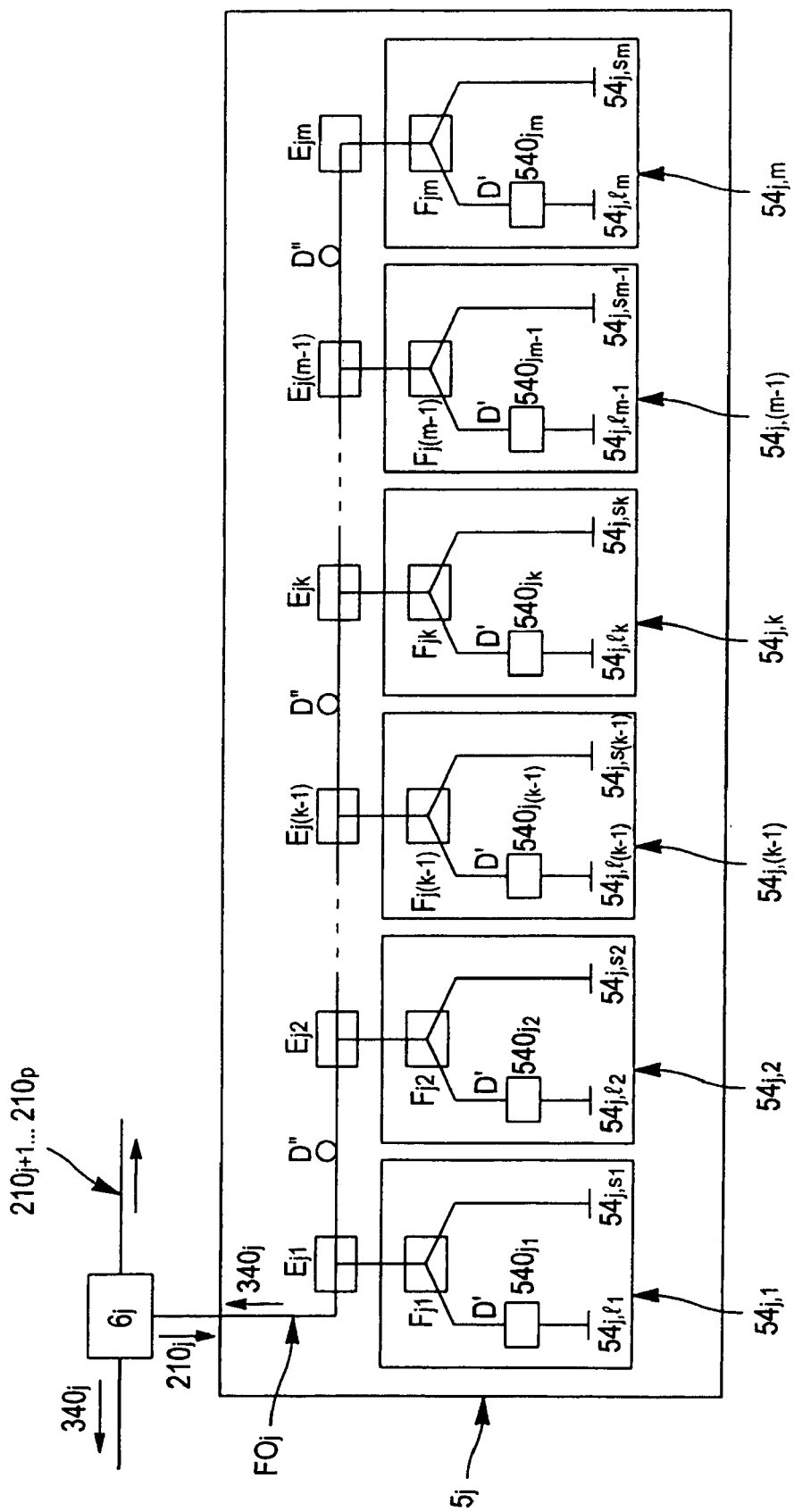
Figures 5B, 5C:
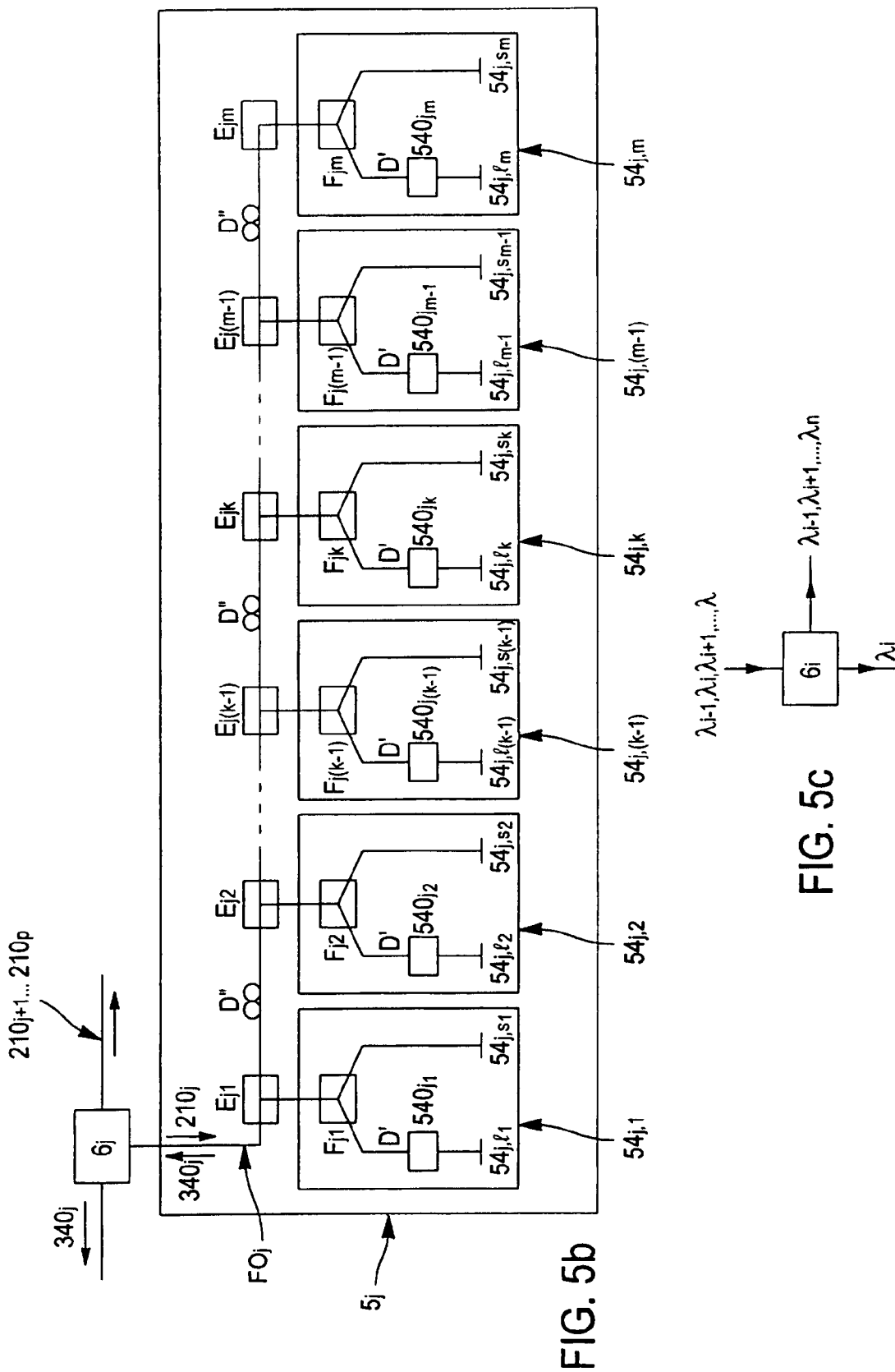

FIG. 3 shows a scheme of a system in accordance with the present invention, based on a combination of the TDM, WDM and FDM techniques, comprising p optical sources 40j ($1 \leq j \leq p$), each emitting a specific wavelength $v_j$, connected to a respective means M1, M2, ..., Mj, ..., Mp for generating the couple of pulses (P1a, P1b), (P2a, P2b), ..., (Pja, Pjb), ..., (Ppa, Ppb) respectively, a photo-detector 70 followed by a demodulator 80 for the interrogation of a plurality of p groups (or nodes) of m FOISs each;

FIG. 4a is a representation of the light 210 in the telemetry fiber 13 at the outlet of a coupler 3 and composed of n couples of two light pulses $210_1$, $210_2$, ..., $210_j$, ..., $210_p$. The light 210j required to interrogate a node 5j ($1 \leq j \leq p$) of m FOISs and is made up of a couple ($P_{ja}$, $P_{jb}$) of light pulses, time-delayed one from another by the pulse delay PDj, the first pulse $P_{ja}$ ($1 \leq j \leq p$) bearing the light of frequency $v_j+F_{ja}$ and the second pulse $P_{jb}$ ($1 \leq j \leq p$) bearing the light of frequency $v_j+F_{jb}$, the couple ($P_{ja}$, $P_{jb}$) being also periodically generated at a repetition frequency Frep;

FIG. 4b is a representation of the group 340 of m*2 couples of light pulses resulting from the couple of light pulses ($P_{ja}$, $P_{jb}$) represented in FIG. 4a, at the output of the m FOIS-node referenced 5j ($1 \leq j \leq p$) illustrated on FIG. 5a;

FIG. 4c is a representation of the group 340 of m*2 couples of light pulses resulting from the couple of light pulses ($P_{ja}$, $P_{jb}$) represented in FIG. 4a, at the output of the m FOIS-node referenced 5j ($1 \leq j \leq p$) illustrated on FIG. 5b;

FIG. 4d is a representation of the m interference signals $I51,m=(I_{1,11}, I_{1,22}, \ldots, I_{1,kk}, \ldots, I_{1,mm})$, $I52,m=(I_{2,11}, I_{2,22}, \ldots, I_{2,kk}, \ldots, I_{2,mm})$, ..., $I5p,m=(I_{p,11}, I_{p,22}, \ldots, I_{p,kk}, \ldots, I_{p,mm})$ on the photo detector 70 resulting respectively from the group 51, 52, ..., 5p of m sensors as represented on FIG. 5a;

FIG. 4e is a representation of the 2m interference signals $I51,2m=(I_{1,11}, R_{1,12}, I_{1,22}, R_{1,23}, \ldots, I_{1,kk}, R_{1,k(k+1)}, \ldots, I_{1,mm} R_{1,m(m+1)})$, $I52,2m=(I_{2,11}, R_{2,12}, I_{2,22}, R_{2,23}, \ldots, I_{2,kk}, R_{2,k(k+1)}, \ldots, I_{2,mm} R_{2,m(m+1)})$, ..., $I5p,2m=(I_{p,11}, R_{p,12}, I_{p,22}, R_{p,23}, \ldots, I_{p,kk}, R_{p,k(k+1)}, \ldots, I_{p,mm} R_{p,m(m+1)})$ on the photo detector 70 resulting respectively from the group 51, 52, ..., 5p of m sensors, as represented on FIG. 5b;

FIG. 4f is a representation of the gating pulses $G_{j,11}$, $G_{j,22}$, ..., $G_{j,mm}$ recorded during a calibration step and respectively used to properly time demultiplex the interference signals $I_{j,11}$, $I_{j,22}$, ..., $I_{j,mm}$ from the group 5j of sensors illustrated on FIG. 5a;

FIG. 5a shows a scheme of one possible way of construction for one m FOIS-node 5j ($1 \leq j \leq p$) of FIG. 3; the m FOISs of the node 5j ($1 \leq j \leq p$) being disposed in a 'series' arrangement from the input point of the node;

FIG. 5b shows a scheme of another possible way of construction for one m FOIS-node 5j ($1 \leq j \leq p$) of FIG. 3; the m FOISs of the node 5j ($1 \leq j \leq p$) being also disposed in a 'series' arrangement from the input point of the node, but the distance between two successive FOIS being twice the light path imbalance between the long arm and the short arm of one FOIS;

FIG. 5c shows a means 6j which selectively extracts the wavelength $\lambda_j$ towards the group 5j of m FOIS.

Figure 6:
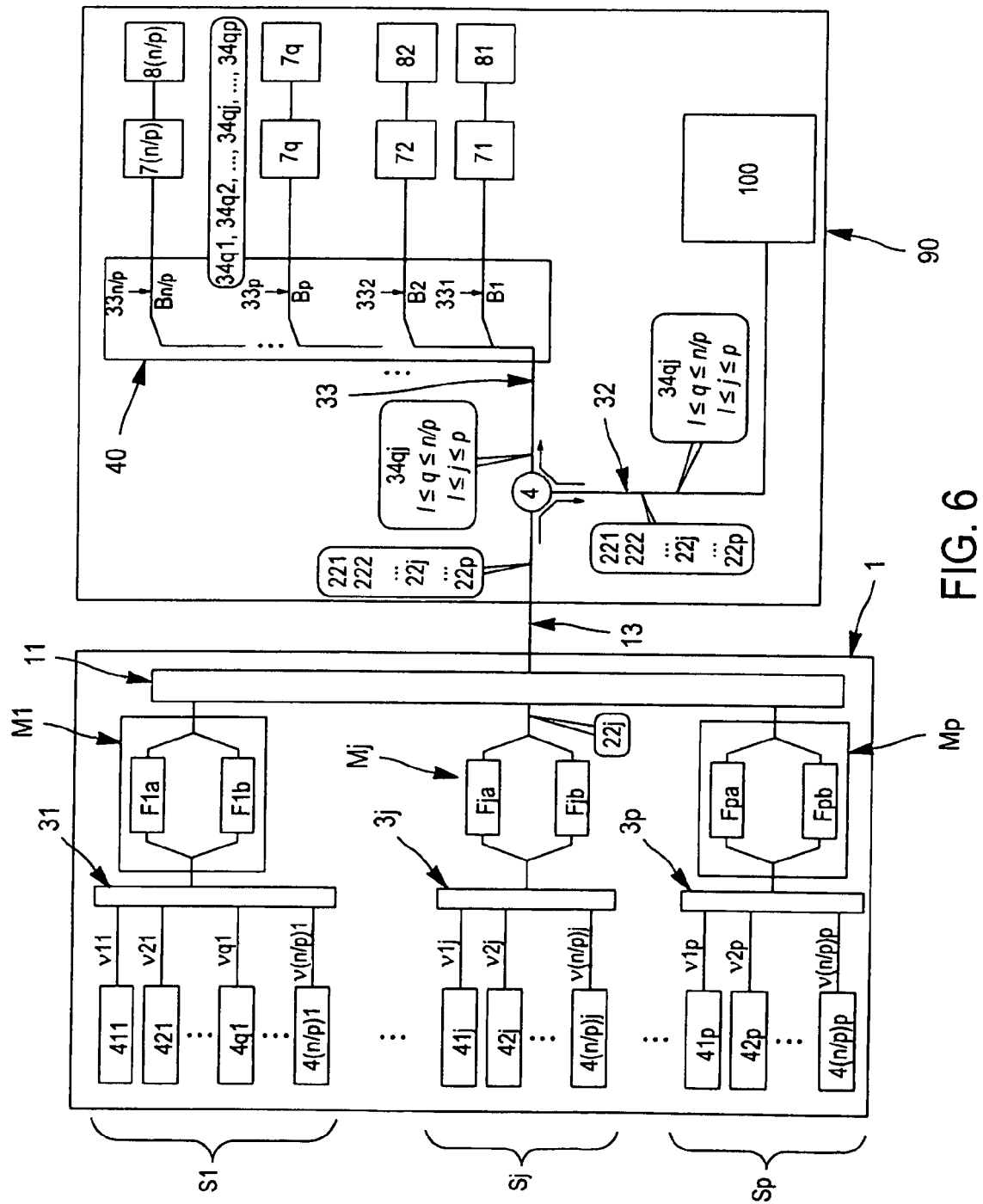
Figure 7:
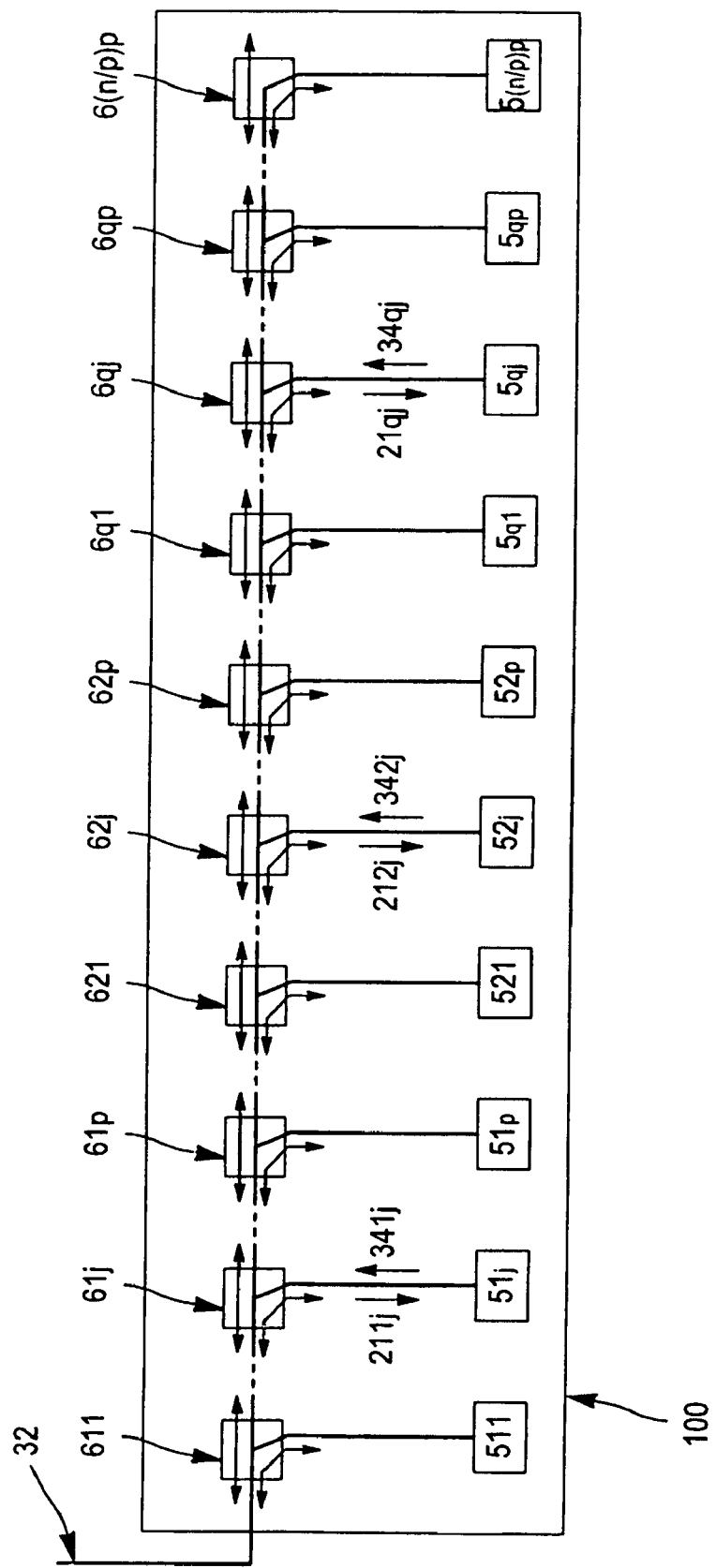
Figure 8A:
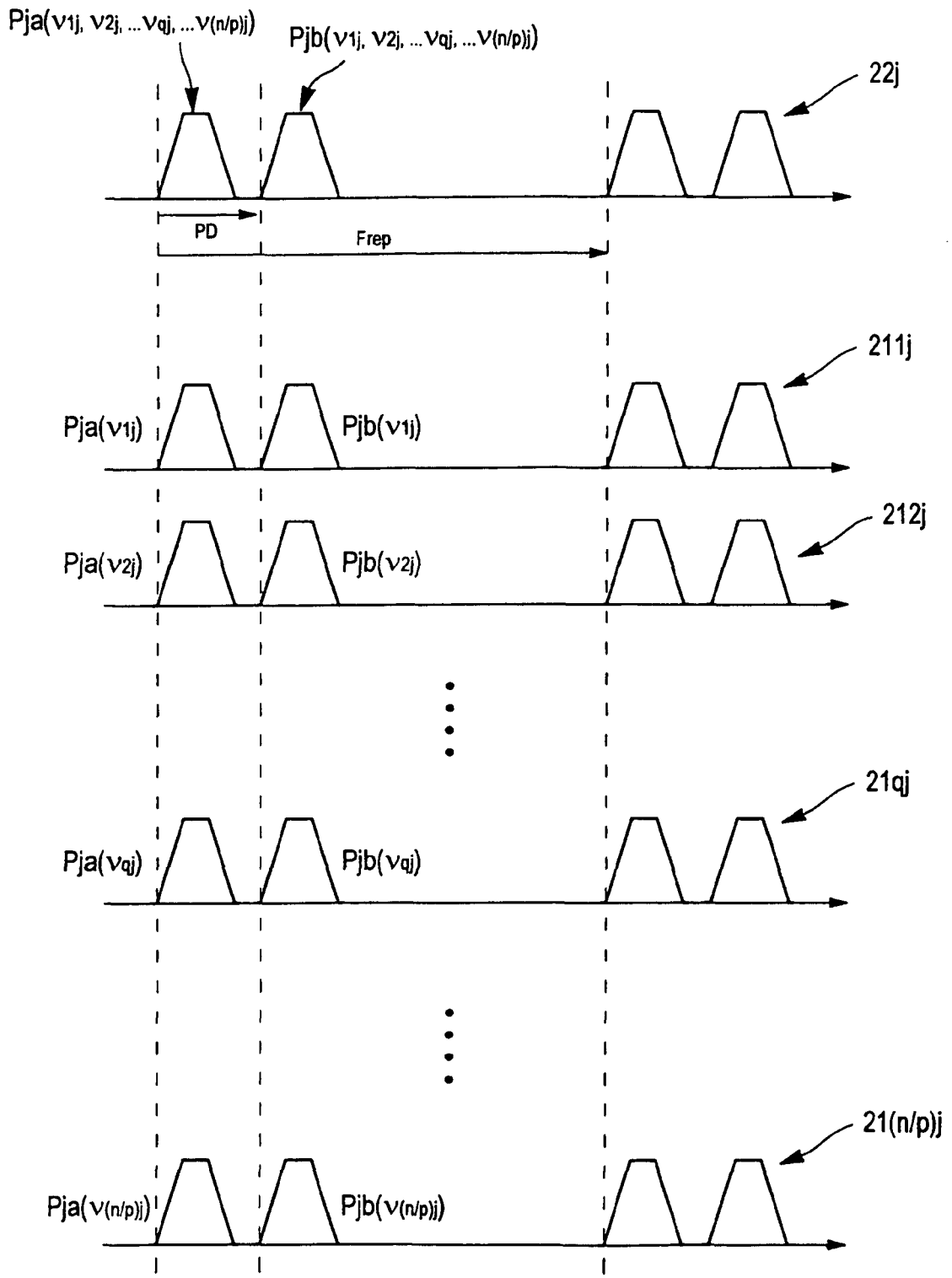
Figure 8B:
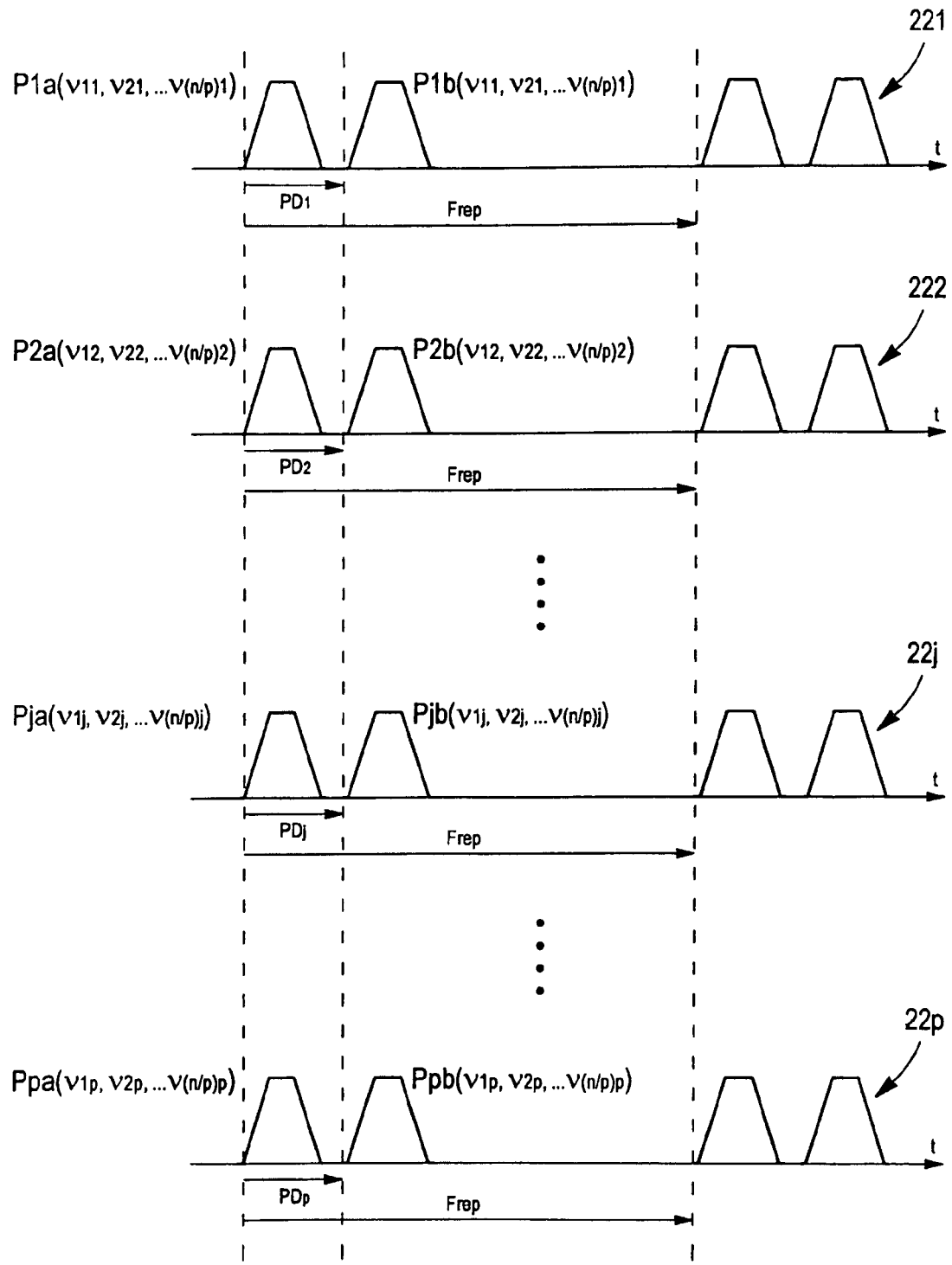
Figure 8C:
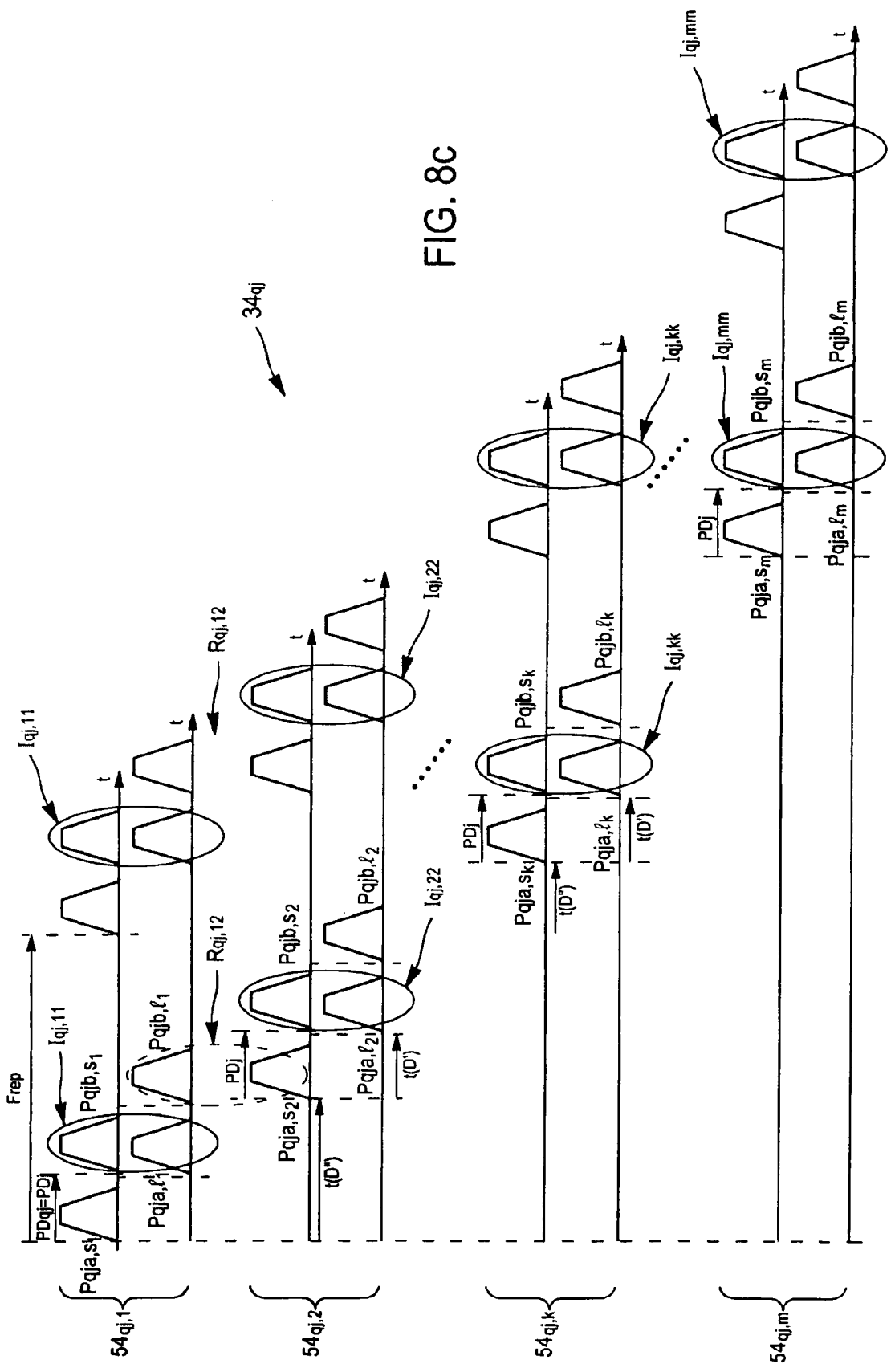
Figure 8D:
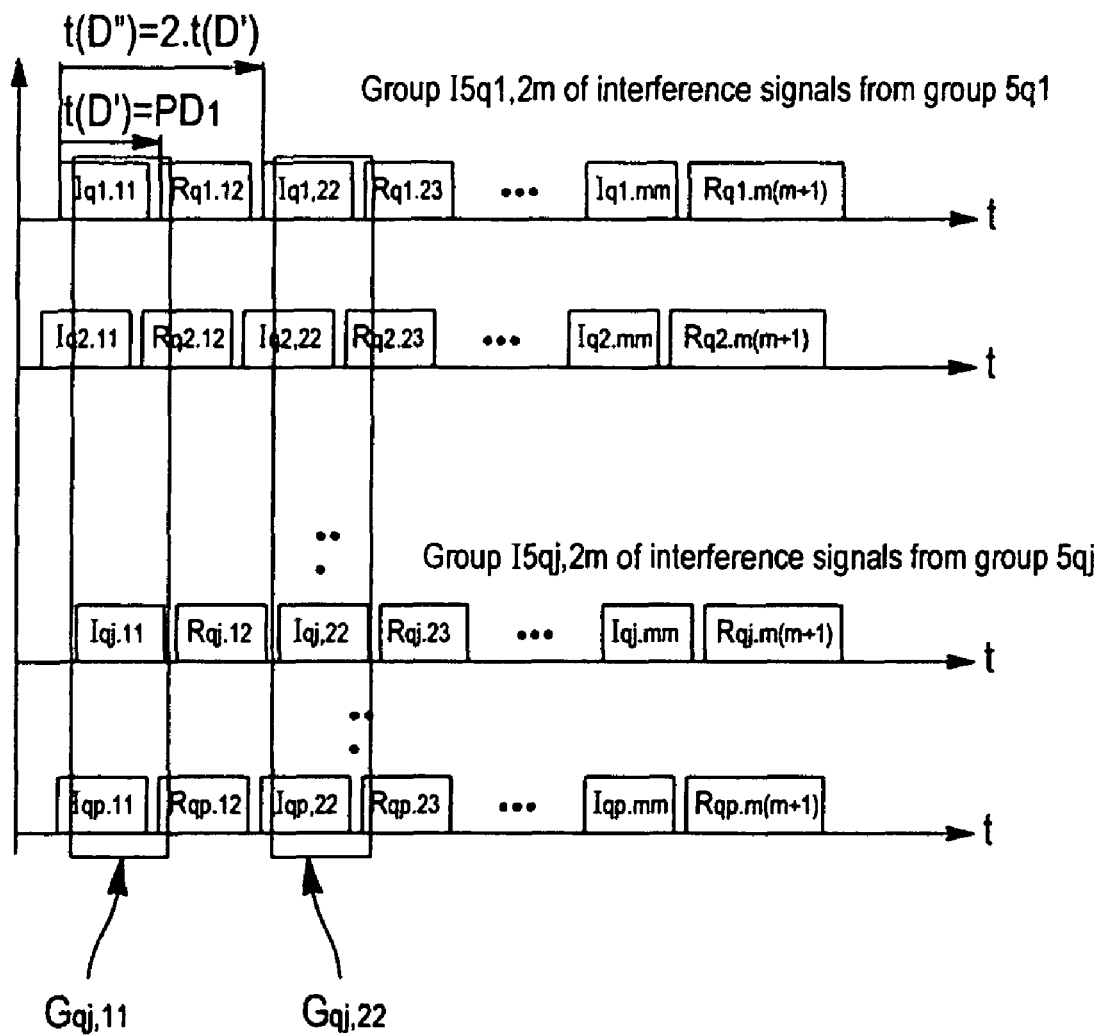
Figure 9:
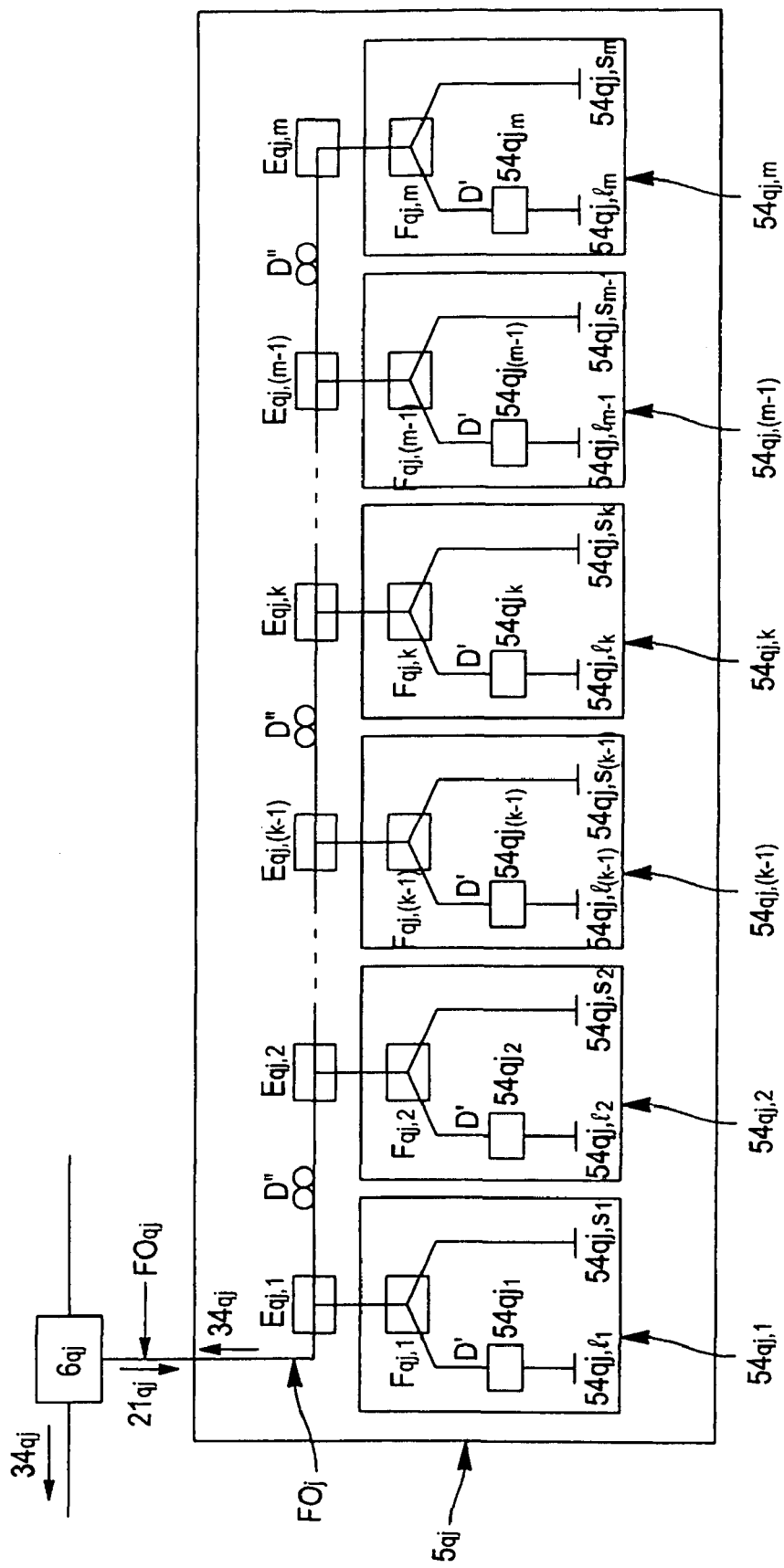
Figure 10:
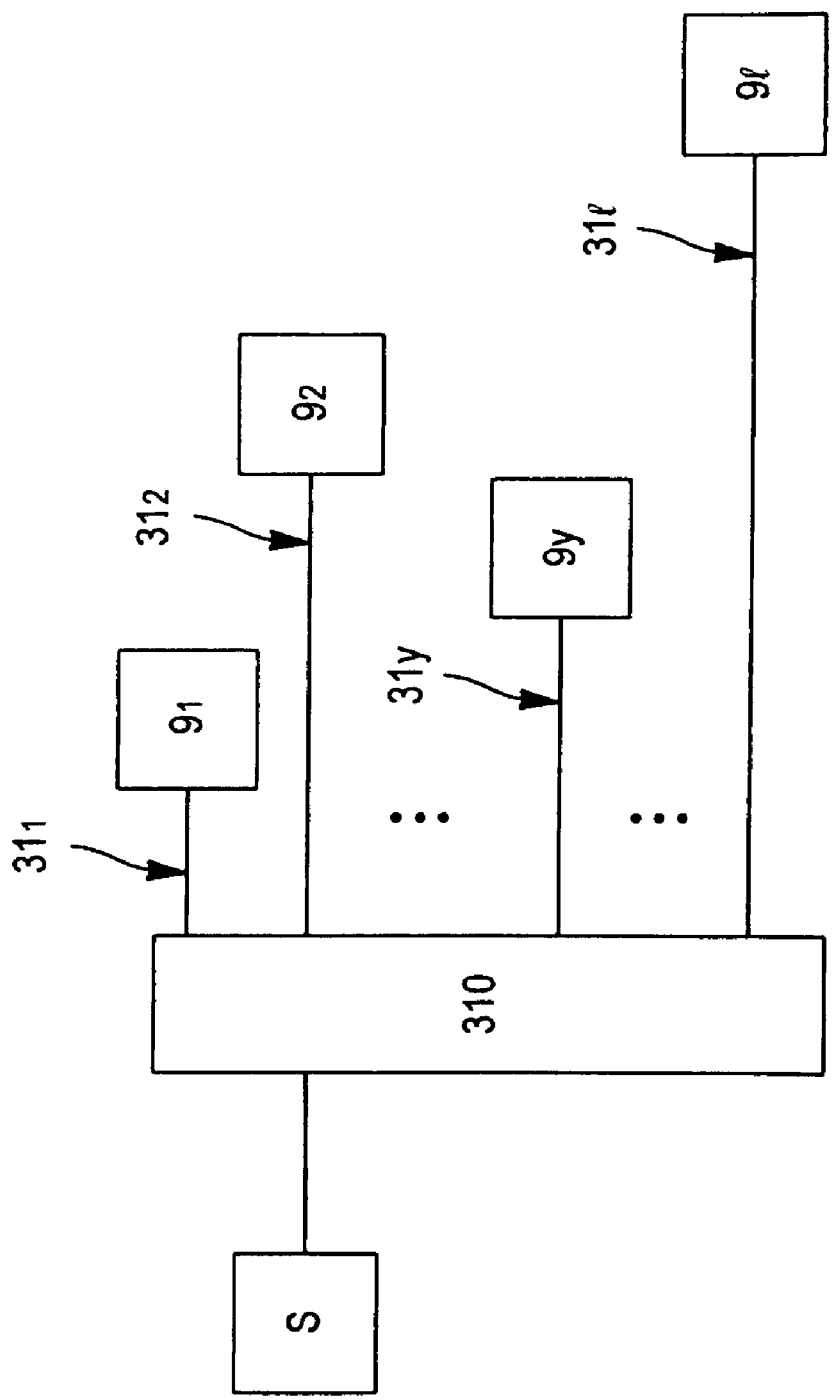

FIG. 6 shows a scheme of a system in accordance with the present invention, based on a combination of the TDM, WDM and FDM techniques, comprising p groups $S_j$ ($1 \leq j \leq p$) of n/p optical sources 4jq ($1 \leq q \leq n/p$ with $p \leq n$ and n/p a positive integer, each group being connected respectively to means $M_j$ and also comprising n/p photo-detectors 7q ($1 \leq q \leq n/p$), for the interrogation of a plurality of n groups (or nodes) of m FOISs each;

FIG. 7 shows in more details the n groups of m FOISs each, which are interrogated by the interrogation system of the complete system-illustrated in FIG. 6;

FIG. 8a is a representation of the light $10j$ at the outlet of the mean Mj ($1 \leq j \leq p$), sent in the telemetry fiber 13 by means of a coupler 11, and that is required to interrogate a number of m*n/p FOISs among the m*n FOISs; this light being made up of the two light pulses $P_{ja}$, $P_{jb}$ time delayed one from another by the delay $PD_j$; the light pulses $P_{ja}$ and $P_{jb}$ are made up of n/p light frequencies, respectively $(v_{j1}+F_{ja}, v_{j2}+F_{ja}, \ldots, v_{jn/p}+F_{ja})$ and $(v_{j1}+F_{jb}, v_{j2}+F_{jb}, \ldots, v_{jn/p}+F_{jb})$;

FIG. 8b is a representation of the groups $221, 222, \ldots, 22j, \ldots, 22p$ of light pulses coupled on the telemetry fiber 13 through the coupler 11 shown in FIG. 6; the light $22j$ (for $1 \leq j \leq p$) being made up of a couple of light pulses $P_{ja}, P_{jb}$ of frequencies $(v_{j1}+F_{ja}, v_{j2}+F_{ja}, \ldots, v_{jn/p}+F_{ja})$ and $(v_{j1}+F_{jb}, v_{j2}+F_{jb}, \ldots, v_{jn/p}+F_{jb})$ respectively, the pulses being time delayed by PDj;

FIG. 8c is a representation of the group $34j$ of m*2 couples of light pulses resulting from the couple of light pulses ($P_{ja}, P_{jb}$) represented in FIG. 8a, at the output of the m FOIS-node referenced $5j$ ($1 \leq j \leq m$) illustrated in FIG. 7 and described in more details in FIG. 9;

FIG. 8d is a representation of the 2m interference signals $I5q1,2m=(I_{q1,11}, R_{q1,12}, I_{q1,22}, R_{q1,23}, \ldots, I_{q1,kk}, R_{q1,k(k+1)}, \ldots, I_{q1,mm} R_{q1,m(m+1)})$, $I5q2,2m=(I_{q2,11}, R_{q2,12}, I_{q2,22}, R_{q2,23}, \ldots, I_{q2,kk}, R_{q2,k(k+1)}, \ldots, I_{q2,mm} R_{q2,m(m+1)}), \ldots, I5qp,2m=(I_{qp,11}, R_{qp,12}, I_{qp,22}, R_{qp,23}, \ldots, I_{qp,kk}, R_{qp,k(k+1)}, \ldots, I_{qp,mm} R_{qp,m(m+1)})$ on the photo detector $7q$ resulting respectively from the group $5q1, 5q2, \ldots, 5qj, \ldots, 5qp$ of m sensors;

FIG. 9 shows one of the n groups of m FOISs, and more precisely, the group $5jq$;

FIG. 10 shows a scheme of a system in accordance with the present invention, based on a combination of the TDM, WDM and FDM techniques, and capable of interrogating l sub-arrays of n nodes of m FOISs.

FIGS. 1 and 2a to 2d describe the principle for the interrogation of one interferometric sensor.

S0 is a coherent light source (preferentially a DFB fiber laser source) of wavelength λ0 (and frequency v0). The continuous light the source S0 enters the mean M0 that is capable of generating the light L at its output. One mode of realization of M0 consists in using two AOMs of different shift frequencies Fa and Fb and combined with two optical couplers. Each AOM allows to shift the frequency and to pulse the amplitude of the light that goes through it. The mean M0 is thus made up of two arms a and b comprising respectively the AOMs a and b. The AOM a (AOM b respectively) is driven by a carrier frequency fa (fb respectively), which is switched on and off, with a pulse sequence a (pulse sequence b respectively). The light La (Lb respectively) at the output of the AOMa (AOMb respectively) is made up of pulses Pa (Pb respectively) of width PW, repeated at a repetition rate Frep. The frequency of light La (Lb respectively) is shifted by Fa (Fb respectively) due to a known property of Acousto Optic Modulators.

The lights La and Lb are recombined by a fiber optic coupler, to form the light L on the telemetry fiber. The light L is made up of Pulse sequences Pa and Pb (see FIG. 2c). Pulse sequence Pa is delayed by a Pulse Delay PDa/b as compared to Pulse sequence Pb. The Pulse Delay PDa/b is achieved by delaying the drivers of AOM b and AOM a.

The Light L goes through a fiber optic circulator C down to the Differential Interferometric Sensor (sensor). The sensor shown on FIG. 1 is a Michelson interferometer. It is made up of 2 arms, one short arm, Arm s, and one long arm, Arm l, ended respectively by two total reflectors R0s and R0l. The Path Imbalance (PI) of the Differential Interferometric Sensor (DIS) corresponds to a time propagation which is equal to Pulse Delay PDa/b.

The reflection of light L by reflectors R0s and R0l gives rise to the light LOut, back to the circulator C. It is driven to a Photo Detector through the fiber Fout. The light LOut gives rise to light interferences on the photo-detector PD, through the optical pulses Pa reflected by the reflector R0l of the DIS and the pulse Pb reflected by the reflector R0s of the DIS. The interferences are born by the heterodyne carrier frequency F=Fa−Fb.

FIG. 3 shows a scheme of a system in accordance with the present invention, based on a combination of TDM, WDM and FDM techniques, and capable of interrogating p groups (or nodes) of m FOISs each. The proposed scheme is based on the state of the art principle (described in FIGS. 1, and 2a to 2d) of interrogation of one FOIS by a pulsed light.

The system comprises means 1 forming an optical source capable of generating the light 210 made up of p couples of light pulses.

The means 1 comprise a series of emitters $401, 402, \ldots, 40j, \ldots, 40p$ emitting a light at a respective frequency $v1, v2, \ldots, vj, \ldots, vp$ which differ one from another. Each emitter $40j$ ($1 \leq j \leq p$) is followed a respective means Mj as the one described in FIG. 1. One mode of realization of Mj consists in using two AOMs aj and bj of different shift frequencies Fja and Fjb and combined with two optical couplers. Each AOM allows to shift the frequency and to pulse the amplitude of the light that goes through it. The mean Mj is thus made up of two arms a and b comprising respectively the AOMs aj and bj. At the outlet of each means Mj the light is thus made up of two light pulses [P1a (v1), P1b (v1)], [P2a (v2), P2b (v2)], ..., [Pja (vj), Pjb (vj)], ..., [Ppa (vp), Ppb (vp)] respectively of frequencies $[v_1+F_{1a}, v_1+F_{1b}], [v_2+F_{2a}, v_2+F_{2b}], \ldots, [v_j+F_{ja}, v_j+F_{jb}], \ldots, [v_p+F_{pa}, v_p+F_{pb}]$. The two light pulses respectively [P1a (v1), P1b (v1)], [P2a (v2), P2b (v2)], ..., [Pja (vj), Pjb (vj)], ..., [Ppa (vp), Ppb (vp)] are time delayed respectively by a pulse delay PD1, PD2, ..., PDj, ..., PDp, and are repeated at a repetition frequency $F_{rep}$.

The respective means M1, ..., Mj, ..., Mp merge onto a coupler 3 (coupler of type "p" towards "1") which send the light pulses Pja (vj), Pjb (vj), for $1 \leq j \leq p$ into the telemetry fiber 13.

Thus, the light 210 driven by the telemetry fiber 13, as shown in FIG. 4a, consists of p*2 light pulses $2101, 2102, \ldots, 210j, \ldots, 210p$ resulting from the respective 2 light pulses coming from the outlets of means M1, ..., Mj, ..., Mp respectively.

Following the light path, the system also comprises a fiber optic circulator 4, p groups (nodes) $51, 52, \ldots, 5j, \ldots, 5p$ of m FOISs to interrogate, p optical wavelength selective means $61, 62, \ldots, 6j, \ldots 6p$, each disposed at the entry of a respective node, a photo-detector 70 and a demodulator 80.

The light 210 carried by the telemetry fiber goes through the fiber optic circulator 4 to the groups $51, 52, \ldots, 5j, \ldots, 5p$ of sensors.

The entry of each group $51, 52, \ldots, 5j, \ldots, 5p$ of sensors has an optical wavelength selective means $61, 62, \ldots, 6j, \ldots, 6p$ around the frequency $v1, v2, \ldots, vj, \ldots vp$ respectively. As shown in FIG. 5c, means $61, 62, \ldots, 6j, \ldots, 6m$ selectively extracts, respectively the wavelength $\lambda_1, \lambda_2, \ldots, \lambda_j, \ldots, \lambda_m$ towards, respectively the group $51, 52, \ldots, 5m$ of FOIS.

For ease of understanding, the description which follows only describes what happens for the $j^{th}$ couple of light pulses $210j$ which goes down to the $j^{th}$ group $5j$, and back to the group $5j$ to the photo-detector 70 (and demodulator 80). The man skilled in the art will understand that a similar description could be done for the other groups 51, 52, . . . , 5(j−1), 5(j+1), . . . , 5p of sensors.

The $j^{th}$ group 5j is shown in details in FIG. 5a or in a preferred embodiment in FIG. 5b.

It consists of a main fiber $FO_j$ extending from the optical wavelength selective means 6j, and comprising m fiber optic couplers Ej,1 Ej,2, . . . , Ej,k, . . . , Ej,m of type <<1 input towards 2 outputs>> disposed in series. For each fiber optic coupler Ej,k (k=1 to m), one output is connected to the next fiber optic coupler Ej,(k+1) on the fiber FOj whereas the second output feeds the FOIS 54j,k.

Each of the m FOIS 54j,1, 54j,2, . . . , 54j,k, 54j,m comprises at its input an optical coupler Fj,1 Fj,2, . . . , Fj,k, . . . , Fj,m of type <<1 input towards 2 outputs>>, followed by two arms: one long arm and one short arm. The long arm forms the long optical path of one FOIS, and the short arm forms the short optical path of the FOIS.

Each of the m FOISs also comprises a compliant body respectively $540_{j1}$, $540_{j2}$, . . . , $540_{jk}$, . . . , $540_{jm}$, arranged on the respective long arms.

The ends of the long and short arms of each of the m FOISs respectively comprise a mirror $54_{j,l1}$, $54_{j,l2}$, . . . , $54_{j,lm}$, $54_{j,s1}$, $54_{j,s2}$, . . . , $54_{j,sm}$. The 2m mirrors $54_{j,l1}$, $54_{j,l2}$, . . . , $54_{j,lm}$, $54_{j,s1}$, $54_{j,s2}$, . . . , $54_{j,sm}$ can either be selective or not in frequency (wavelength). If the 2m mirrors $54_{j,l1}$, $54_{j,l2}$, . . . , $54_{j,lm}$, $54_{j,s1}$, $54_{j,s2}$, . . . , $54_{j,sm}$ are frequency (wavelength) selective, they preferentially are Fiber Bragg Gratings that selectively reflects, respectively, frequency vj.

The round trip imbalance between the long and short mirrors of each of the m FOISs is equal to D' and corresponds to a time delay t(D') close to the pulse delay PDj between the pulses Pja(vj) and Pjb(vj). The round trip path imbalance between two successive FOIS 54j,(k−1) and 54j,k (for 1≦k≦m) is equal to D" and corresponds to a time delay t(D").

In the mode of realization illustrated in FIG. 5a, the time delay t(D") is close to the pulse delay between the pulses Pja(vj) and Pjb(vj) and named PDj, whereas in the mode of realization illustrated in FIG. 5b, the time delay t(D") is close to twice the pulse delay PDj.

We will now clear the path taken by the pulses for both modes of realization.

The couple 210j of light pulses Pja(vj), Pjb(vj) entering the group 5j of m FOISs is driven by fiber optic FOj to a fiber optic coupler Ej1. One part of the power is directed to FOIS 54j,1 and the other part feeds another fiber optic coupler Ej,2 that splits the light into one part driven to the second FOIS 54j2, the other part feeding a third fiber optic coupler Ej3 and so on.

At the input of the FOIS 54j,k (1≦k≦m), the light is a power fraction of the couple of light pulses Pja(vj), Pjb(vj). It is sent to the fiber optic coupler Fj,k that divides it into two identical lights of equal power directed towards the short and long mirrors 54j,lk and 54j,sk. The lights reflected by the mirrors 54j,lk and 54j,sk are then recoupled by the couplers Fj,k and Ej,k onto the optical fiber FOj. The reflection of the light onto the short mirror 54j,sk gives rise to the couple of pulses [Pja,sk(vj); Pjb,sk(vj)] whereas its reflection onto the long mirror 54j,lk gives rise to the couple of light pulses [Pja,lk(vj); Pjb,lk(vj)]. The two couples [Pja,sk(vqj); Pjb,sk(vj)] and [Pja,lk(vj); Pjb,lk(vj)] being time delayed one from the other by t(D'), which is close to the pulse delay PDj.

Thus, at the output of the node 5j, the group 340j illustrated of m*2 couples of pulses [$P_{ja,s1}$(vi), $P_{jb,s1}$(vj)], [$P_{ja,l1}$(vj), $P_{jb,l1}$(vj)], . . . , [$P_{ja,sk}$(vj), $P_{jb,sk}$(vj)], [$P_{ja,lk}$(vj), $P_{jb,lk}$(vj)], . . . , [$P_{ja,sm}$(vj), $P_{jb,sm}$(vj)], [$P_{ja,lm}$(vj), $P_{jb,lm}$(vj)], represented by FIG. 4b or FIG. 4c, is formed: the 2 couples of pulses {[$P_{ja,sk}$(vj), $P_{jb,sk}$(vj)], [$P_{ja,lk}$(vj), $P_{jb,lk}$(vj)]}, and the 2 couples of pulses {[$P_{ja,s(k-1)}$(vj), $P_{jb,s(k-1)}$(vj)], [$P_{ja,l(k-1)}$(vj), $P_{jb,l(k-1)}$(vj)]}, 1≦k≦m, being time delayed one from another by the time t(D"), the 2 couples of pulses [$P_{ja,sk}$(vj), $P_{jb,sk}$(vj)] and [$P_{ja,lk}$(vj), $P_{jb,lk}$(vj)] being time delayed one from another by the time t(D'), and the two pulses $P_{ja,sk}$(vj) and $P_{jb,sk}$(vj) of couple [$P_{ja,sk}$(vj), $P_{jb,sk}$(vj)] and $P_{ja,lk}$(vj) and $P_{jb,lk}$(vj) of couple [$P_{ja,lk}$(vj), $P_{jb,lk}$(vj)] being time delayed one from another by the pulse delay PDj. In the scheme of FIG. 4b corresponding to the embodiment illustrated in FIG. 5a, the time delays t(D'), t(D") and PDj are equal. In the scheme of FIG. 4c corresponding to the embodiment illustrated in FIG. 5b, the time delay t(D") is twice the time delays t(D') and PDj.

The combination of the pulses $P_{jb,sk}(v_j)$ and $P_{ja,lk}(v_j)$ onto the photo diode 80, gives rise to an interference signal Ij,kk at the Carrier Frequency Fj=Fjb−Fja that carries the sensor 540j,k response to an external excitation. As can be seen in FIG. 4c, the embodiment illustrated in FIG. 5b offers a redundant interference signals for the sensors $540_{j,1}$, $540_{j,2}$, . . . , $540_{j,m-1}$, respectively $R_{j,12}$, $R_{j,23}$ $R_{j,m(m+1)}$.

For example, the redundant interference signal Rj,12 for the sensor $540_{j,1}$ results from the interference between the pulses $P_{jb,l1}(v_j)$ and $P_{ja,s2}(v_j)$. One can show that the phase information $\Phi_{main}$ born by the interference signal Ij11, for the sensor $540_{j,1}$ is linked to the common cumulated phase noise $\Phi_{ccpn}$ and the sensor phase signal $\Phi_{sps}$ by the relationship:

$$\Phi_{main} = \Phi_{ccpn} - \Phi_{sps} \qquad (1)$$

Where $\Phi_{sps}$ is the phase generated on the frequency carrier Fj by an external excitation localized on the sensor 540j,1, and $\Phi_{ccpn}$ is the phase noise accumulated on the carrier frequency, phase noise that one aims at getting rid off.

One can also show that the phase information $\Phi_{redundant}$ born by the redundant interference signal Rj,12 for the sensor $540_{j,1}$ is linked to the common cumulated phase noise $\Phi_{ccpn}$, to the sensor phase signal $\Phi_{sps}$ and to the cumulated phase modulation $\Phi_{s+1,s}$ that the carrier might be altered with through the path from Fj1 to Fj2, by the relationship:

$$\Phi_{redundant} = \Phi_{ccpn} + \Phi_{sps} - \Phi_{s+1,s} \qquad (2)$$

Accordingly, by substracting the relationships (2) and (1), one can obtain the following relationship:

$$\Phi_{redundant} - \Phi_{main} = 2*\Phi_{sps} + \Phi_{s+1,s} \qquad (3)$$

Equation 3 shows that one doubled the sensitivity of the sensor 54j,1 (2*$\Phi_{sps}$ instead of $\Phi_{sps}$) and got rid of the unwanted noise term $\Phi_{ccpn}$. On the other hand, the unwanted term $\Phi_{s+1,s}$ that corresponds to the cumulated phase modulation that the carrier might be altered with through the path from Fj1 to Fj2, appeared, but can be far reduced by isolating the corresponding fiber.

More generally, each sensor $540_{j,k}$ (k=1 to m) gives rise to 2 interference signals $I_{j,kk}$ and $R_{j,k(k+1)}$ which can be used as previously described.

Thus, the preferred embodiment of the arrangement of the m FOISs (illustrated in FIG. 5b) offers the possibility to eliminate the common phase noise and to double the system sensitivity.

Independently of the mode of implementation of FIG. 5a or 5b, the $j^{th}$ group 340j of m*2 couples of light pulses is then driven to the photo-detector and to the demodulator by the means 6j and the circulator 4. Thus, the group 5j of m sensors represented by FIG. 5a gives rise on the photo detector 70 to the group I5j,m of m interference signals ($I_{j,11}$, $I_{j,22}$, . . . , $I_{j,kk}$, . . . , $I_{j,mm}$) and the group 5j of m sensors represented by FIG. 5b gives rise on the photo detector 70 to the group I5j,2m of 2.m interference signals ($I_{j,11}$, $R_{j,12}$, $I_{j,22}$, $R_{j,23}$, . . . , $I_{j,kk}$, $R_{j,k(k+1)}, \ldots, I_{j,mm} R_{j,m(m+1)}$). Then, the m interference signals $I_{j,11}, I_{j,22}, \ldots, I_{j,kk}, \ldots, I_{j,mm}$ or the 2m interference signals $(I_{j,11}, R_{j,12}, I_{j,22}, R_{j,23}, \ldots, I_{j,kk}, R_{j,k(k+1)}, \ldots, I_{j,mm} R_{j,m(m+1)})$ corresponding to the m sensors 540j,1, 540j,2, ..., 540j, k, ..., 540j,m from the $j^{th}$ group 5j of sensors are time demultiplexed by pulse gating means.

Similarly, each group 51, 52, ..., 5p of m sensors represented on FIG. 5a gives rise on the photo detector 70 to the group of m interference signals respectively $I51,m=(I_{1,11}, I_{1,22}, \ldots, I_{1,kk}, \ldots, I_{1,mm})$, $I52,m=(I_{2,11}, I_{2,22}, \ldots, I_{2,kk}, \ldots, I_{2,mm}), \ldots, I5p,m=(I_{p,11}, I_{p,22}, \ldots, I_{p,kk}, \ldots, I_{p,mm})$ and represented on FIG. 4d. Similarly, each group 51, 52, ..., 5p of m sensors represented on FIG. 5b gives rise on the photo detector 70 to the group of 2m interference signals respectively $I51,2m=(I_{1,11}, R_{1,12}, I_{1,22}, R_{1,23}, \ldots, I_{1,kk}, R_{1,k(k+1)}, \ldots, I_{1,mm} R_{1,m(m+1)})$, $I52,2m=(I_{2,11}, R_{2,12}, I_{2,22}, R_{2,23}, \ldots, I_{2,kk}, R_{2,k(k+1)}, \ldots, I_{2,mm} R_{2,m(m+1)}), \ldots, I5p,2m=(I_{p,11}, R_{p,12}, I_{p,22}, R_{p,23}, \ldots, I_{p,kk}, R_{p,k(k+1)}, \ldots, I_{p,mm} R_{p,m(m+1)})$ and represented on FIG. 4e. The photo-detector and the demodulator thus receive p groups of m or 2m interference signals each. The means 1 forming the optical source also comprise calibration means. More precisely, the calibration means allow, during the calibration step, the emitters 40j for $1 \leq j \leq p$ to be successively turned on and off: when the emitter 401 of frequency v1 is on, the other emitters are turned off, then the emitter 401 is turned off and the emitter 402 is turned on, whereas the other emitters remain off, and so on. This calibration step enables to sequentially take and record the absolute time 'footprints' of each group I5j,m (or I5j,2m) of interference signals resulting on photo-detector 70 from the group 5j of m sensors when the optical sources 401, 402, ... 40j−1, 40j+1, ..., 40p are turned off. Indeed, the p groups I51,m, ..., I5j,m, ... I5p,m (or I51,2m, ..., I5j, 2m, ... I5p,2m) of interference signals, are in general not time aligned on the photo detector 70 (if one doesn't take care of the optical path in between two consecutive groups of sensors), and in order to achieve proper time pulse gating (i.e. time demultiplexing) of the $m^{th}$ interference signals Ij,11, Ij,22, ..., Ij,kk, ..., Ij,mm (or the 2m interference signals $(I_{j,11}, R_{j,12}, I_{j,22}, R_{j,23}, \ldots, I_{j,kk}, R_{j,k(k+1)}, \ldots, I_{j,mm} R_{j,m(m+1)})$) for each group 5j (j=1 to p) of sensors, the mentioned calibration step is required.

More precisely, when the emitter 40j is on and all the others are off, the photo-detector 70 only receives the group I5j,m (or I5j,2m) of interference signals illustrated in FIG. 4d (respectively FIG. 4e) allowing the calibration means to take and register the absolute time foot prints corresponding to the particular group of sensors 5j.

Accordingly, during the interrogation phase (following the calibration step) that is to say when all the emitters are simultaneously on, pulse gating is achieved for each group 5j of sensors thanks to the absolute time footprints gathered and registered during the calibration step, allowing for a proper time demultiplexing of the interference signals from the m sensors. FIG. 4f shows the gating pulses $G_{j,11}, G_{j,22}, \ldots, G_{j,mm}$ recorded during the calibration step and respectively used to properly time demultiplex the interference signals $I_{j,11}, I_{j,22}, \ldots, I_{j,mm}$ from the group 5j of sensors. It is shown that the lights respectively gated by $G_{j,11}, G_{j,22}, \ldots, G_{j,mm}$ also contain interference signals from the other groups of sensors and born by frequencies Fk, k≠j: the demodulation at the particular frequency Fj therefore allows to isolate the signals from the sensors of group 5j exclusively (Frequency Demultiplexing).

This technique allows the optical path to be loosely adjustable between any two groups of sensors (nodes). And this technique makes it possible to increase the number of sensors which response can be read by one single photo detector 70 by one dimension: number of wavelengths $n_\lambda \times$ number of frequencies $n_{FDM/\lambda}$ (when previous art solutions offered density multiplexing on one photo receiver equal to either the number of wavelengths or the number of frequencies, see table 1a).

FIG. 6 is a schematic of a system in accordance with the present invention, increasing the multiplexing density of the system described by FIGS. 3, 5a and 5b to a higher quantity of groups of sensors (nodes), The means 1 comprise p groups $S_j$ ($1 \leq j \leq p$ where $p \leq n$) each made up of n/p optical sources 41j, 42j, ..., 4qj, ..., 4(n/p)j with $p \leq n$ and n/p a positive integer, for $1 \leq j \leq p$), each optical source 4qj emitting a light at a respective frequency vqj (for $1 \leq q \leq n/p$ $1 \leq j \leq p$) and being different one from another.

The frequencies vqj ($1 \leq q \leq n/p$, $1 \leq j \leq p$) can be written in the form $v_{11}, v_{21}, \ldots, v_{q1}, \ldots, v_{(n/p)1}, v_{12}, v_{22}, \ldots, v_{q2}, \ldots, v_{(n/p)2}, \ldots, v_{1j}, v_{2j}, \ldots, v_{qj}, \ldots, v_{(n/p)j}, \ldots, v_{1p}, v_{2p}, \ldots, v_{qp}, \ldots, v_{(n/p)p}$ and chosen such that $v_{11} < v_{12} < \ldots < v_{1j} < \ldots < v_{1p} < v_{21} < v_{22} < \ldots < v_{2j} < \ldots < v_{2p} < \ldots < v_{q1} < v_{q2} < \ldots < v_{qj} < \ldots < v_{qp} < \ldots < v_{(n/p)1} < v_{(n/p)2} < \ldots < v_{(n/p)j} < \ldots < v_{(n/p)p}$.

Each group Sj is followed by a mean 3j ($1 \leq j \leq p$). 3j can be a fiber optic coupler of type "n/p towards 1", but is preferentially a wavelength multiplexer.

At the outlet of each mean 3j, the light is then driven to a respective means Mj ($1 \leq j \leq p$) as the one described in FIG. 1, and as shown in FIG. 6. In one mode of realization, the means Mj consists of two Acousto Optical Modulators (AOMs) aj and bj of different shift frequencies Fja and Fjb and combined with two optical couplers. Each AOM allows to shift the frequency and to pulse the amplitude of the light that goes through it. The mean Mj is thus made up of two arms comprising respectively the AOMs aj and bj.

FIG. 8a describes the light 22j ($1 \leq j \leq p$) at the outlet of each means Mj (for $1 \leq j \leq p$): it is made up of two light pulses Pja ($v_{1j}, v_{2j}, \ldots, v_{qj}, \ldots v_{(n/p)j}$) and Pjb ($v_{1j}, v_{2j}, \ldots, v_{qj}, \ldots, v_{(n/p)j}$) of frequencies respectively ($v_{1j}+F_{ja}, v_{2j}+F_{ja}, \ldots, v_{(n/p)j}+F_{ja}$) and ($v_{1j}+F_{jb}, v_{2j}+F_{jb}, \ldots, v_{(n/p)j}+F_{jb}$). The two light pulses Pja ($v_{1j}, v_{2j}, \ldots, v_{qj}, \ldots, v_{(n/p)j}$) and Pjb($v_{1j}, v_{2j}, \ldots, v_{qj}, \ldots, v_{(n/p)j}$) are time delayed respectively by a pulse delay PDj, and are repeated at a repetition frequency $F_{rep}$. The light 22j can be seen as the sum of the n/p lights 211j, 212j, ..., 21qj, ..., 21(n/p)j of wavelengths respectively $v_{1j}, v_{2j}, \ldots, v_{qj}, \ldots, v_{(n/p)j}$.

The output lights 221, 222, ..., 22j, ..., 22p from the means M1, ..., Mj, ..., Mp merge onto the telemetry fiber 13 through a coupler 11 (coupler of type "p" towards "1") and are driven to the groups of sensors 100 through the fiber optic circulator 4.

The group of sensors 100 is made up of n groups (nodes) 5qj (for $1 \leq q \leq n/p$ and $1 \leq j \leq p$) of m FOISs each, which can be written in the form 511, 512, ..., 51j, ..., 51p, 521, 522, ...52j, ..., 52p, ..., 5q1, 5q2, ..., 5qj, ...5qp, ..., 5(n/p)1, 5(n/p)2, ..., 5(n/p)j, ...5(n/p)p. The entry of each group 5qj (for $1 \leq q \leq n/p$ and $1 \leq j \leq p$) has an optical wavelength selective means 6qj which extracts the wavelength vqj from the light at its input and drives it to the group of sensors 5qj, while passing the remaining part of the light.

As can be seen in FIG. 7, the n groups 511, 512, ..., 51j, ..., 51p, 521, 522, ... 52j, ..., 52p, ..., 5q1, 5q2, ..., 5qj, ... 5qp, ..., 5(n/p)1, 5(n/p)2, ..., 5(n/p)j, ... 5(n/p)p are successively arranged on the optical fiber 32, and separated by optical fiber sections that can be of any length and don't have to be equal in length one with another.

For ease of understanding, the description which follows only describes what happens with the light pulses 21qj ($1 \leq q \leq n/p$ and $1 \leq j \leq p$) formed by the pulses Pja(vqj) and Pjb(vqj) of frequencies vqj+Fja and vqj+Fjb, which feed the group $5qj$ of FOISs. The man skilled in the art will understand that a similar description could be done for any other groups of sensors.

One mode of realization of the group $5qj$ is shown in details in FIG. 9. It corresponds to the group already illustrated in FIG. 5b.

Accordingly, it consists of a main fiber $FO_{qj}$ extending from the optical wavelength selective means $6qj$, and comprising m fiber optic coupler Eqj,1 Eqj,2, . . . , Eqj,k, . . . , Eqj,m of type <<1 input towards 2 outputs>> disposed in series. For each fiber optic coupler Eqj,k (k=1 to m), one output is connected to the next fiber optic coupler Eqj,(k+1) on the fiber FOqj whereas the second output feeds the FOIS $54qj,k$.

Each of the m FOIS $54qj,1, 54qj,2, \ldots, 54qj,k, \ldots, 54qj,m$ comprises at its input an optical coupler Fqj,1 Fqj,2, . . . , Fqj,k, . . . , Fqj,m of type <<1 input towards 2 outputs>>, followed by two arms: one long arm and one short arm. The long arm forms the long optical path of the FOIS, and the short arm forms the short optical path of the FOIS.

Each of the m FOISs also comprises a compliant body respectively $540_{qj,1}, 540_{qj,2}, \ldots, 540_{qj,k}, \ldots, 540_{qj,m}$, arranged in the long arms.

The ends of the long and short arms of each of the m FOISs respectively comprise a mirror $54_{qj,l1}, 54_{qj,l2}, \ldots, 54_{qj,lk}, \ldots, 54_{qj,lm}, 54_{qj,s1}, 54_{qj,s2}, \ldots, 54_{qj,lk}, \ldots, 54_{qj,sm}$. The 2m mirrors $54_{qj,l1}, 54_{qj,l2}, \ldots, 54_{qj,lk}, \ldots, 54_{qj,lm}, 54_{qj,s1}, 54_{qj,s2}, \ldots, 54_{qj,lk}, \ldots, 54_{qj,sm}$ can either be selective or not in frequency (wavelength). If they are frequency (wavelength) selective, they preferentially are Fiber Bragg Gratings that reflects frequency $\nu_{qj}$.

The round trip imbalance between the long and short mirrors of each of the m FOISs is equal to D' and corresponds to a time delay t(D') close to the pulse delay PDj between the pulses Pja(vqj) and Pjb(vqj). The round trip path imbalance between two successive FOIS $54qj,(k-1)$ and $54qj,k$ (for $1 \leq k \leq m$) of the group $54qj$ is equal to D" and corresponds to a time delay t(D").

In the mode of realization illustrated in FIG. 9, the time delay t(D") is close to twice the pulse delay PDj.

The couple $21qj$ of light pulses Pja(vqj), Pjb(vqj) entering the group $5qj$ of m FOISs is driven by the fiber optic FOqj to a fiber optic coupler Eqj,1. One part of the power is directed to FOIS $54qj,1$ and the other part feeds another fiber optic coupler Eqj,2 that splits the light into one part driven to the second FOIS $54qj,2$, the other part feeding a third fiber optic coupler Eqj,3 and so on.

At the input of the FOIS $54qj,k$ ($1 \leq k \leq m$), the light is a power fraction of the couple of light pulses Pja(vqj), Pjb(vqj). It is sent to the fiber optic coupler Fqj,k that divides it into two identical lights of equal power directed towards the short and long mirrors $54qj,lk$ and $54qj,sk$. The lights reflected by the mirrors $54qj,lk$ and $54qj,sk$ are then recoupled by the couplers Fqj,k and Eqj,k into the optical fiber FOqj. The reflection of the light onto the short mirror $54qj,sk$ gives rise to the couple of pulses [Pqja,sk(vqj); Pqjb,sk(vqj)] whereas its reflection onto the long mirror $54qj,lk$ gives rise to the couple of light pulses [Pqja,lk(vqj); Pqjb,lk(vqj)]. The two couples [Pqja,sk (vqj); Pqjb,sk(vqj)] and [Pqja,lk(vqj); Pqjb,lk(vqj)] being time delayed one from the other by t(D'), which is close to the pulse delay PDj.

Thus, at the output of the node $5qj$, the group $34qj$ of m*2 couples of pulses $[P_{qja,s1}(vqj), P_{qjb,s1}(vqj)], [P_{qja,l1}(vqj), P_{qjb,l1}(vqj)], \ldots, [P_{qja,sk}(vvqj), P_{qjb,sk}(vqj)], [P_{qja,lk}(vqj), P_{qjb,lk}(vqj)], \ldots, [P_{qja,sm}(vqj), P_{qjb,sm}(vqj)], [P_{qja,lm}(vqj), P_{qjb,lm}(vqj)]$, represented by FIG. 8c, is formed: the 2 couples of pulses $\{[P_{jqa,sk}(vqj), P_{jqb,sk}(vqj)], [P_{jqa,lk}(vqj), P_{jqb,lk}(vqj)]\}$, and the 2 couples of pulses $\{[P_{qja,s(k-1)}(vqj), P_{qjb,s(k-1)}(vqj)], [P_{qja,l(k-1)}(vqj), P_{qjb,l(k-1)}(vqj)]\}$, $1 \leq k \leq m$, being time delayed one from another by the time t(D"), the 2 couples of pulses $[P_{qja,sk}(vqj), P_{qjb,sk}(vqj)]$ and $[P_{qja,lk}(vqj), P_{qjb,lk}(vqj)]$ being time delayed one from another by the time t(D'), and the two pulses $P_{qja,sk}(vqj)$ and $P_{qjb,sk}(vqj)$ of couple $[P_{qja,sk}(vqj), P_{qjb,sk}(vqj)]$ and $P_{qja,lk}(vqj)$ and $P_{qjb,lk}(vqj)$ of couple $[P_{qja,lk}(vqj), P_{qjb,lk}(vqj)]$ being time delayed one from another by the pulse delay PDj. In the scheme of FIG. 8c corresponding to the embodiment illustrated in FIG. 9, the time delay t(D") is twice the time delays t(D') and PDj. As explained for the arrangement of a node illustrated in FIG. 5b, the arrangement illustrated in FIG. 8c offers the possibility to eliminate the common phase noise and to double the system sensitivity.

In an alternative embodiment, one can have a node where the round trip path imbalance D" between two successive FOIS is equal to $PD_j$.

The group $34qj$ of m*2 couples of pulses is thus recoupled back onto the main fiber 32 by means of $6qj$, and driven back to the circulator 4 which then directs it to a wavelength demultiplexing system 40 through the fiber 33. The light entering the system 40 is thus made up of n groups $34qj$ ($1 \leq q \leq n/p$ and $1 \leq j \leq p$) of m*2 couples of pulses. The system 40 separates the light at its input onto n/p different outputs $33_1, 33_2, \ldots, 33_q, \ldots, 33_{n/p}$ containing respectively the lights of wavelength bands $B_1, B_2, \ldots, B_{n/p}$, where $B_1$ contains the p wavelengths $(\nu_{11}, \nu_{12}, \ldots, \nu_{1j}, \ldots, \nu_{1p})$, $B_2$ contains the p wavelengths $(\nu_{21}, \nu_{22}, \ldots, \nu_{2j}, \ldots, \nu_{2p})$, ... and $B_{n/p}$ contains the p wavelengths $(\nu_{(n/p)1}, \nu_{(n/p)2}, \ldots, \nu_{(n/p)j}, \ldots, \nu_{(n/p)p})$. Each fiber $33_q$ ($1 \leq q \leq n/p$) is followed by a photo-detector $7q$ and a demodulator scheme $8q$.

Accordingly, each photo-detector $7q$ ($1 \leq q \leq n/p$) receives the p groups of lights ($34q1, 34q2, \ldots, 34qj, \ldots, 34qp$) resulting respectively from the groups $5q1, 5q2, \ldots, 5qj, \ldots, 5qp$ (where the sensors are arranged as described below) and giving rise to the interference signals shown by FIG. 8d. Thus, the group $5q1$ ($1 \leq q \leq n/p$) of sensors gives rise on the photo detector $7q$ to the group of interference signals Group I5q1,2m={Iq1,11, Rq1,12, Iq1,22, Rq1,23, . . . Iq1,mm, Rq1,m(m+1)}; the group $5q2$ ($1 \leq q \leq n/p$) of sensors gives rise on the photo detector $7q$ to the group of interference signals I5q2,2m={Iq2,11, Rq2,12, Iq2,22, Rq2,23, . . . Iq2,mm, Rq2,m(m+1)}; . . . ; the group $5qj$ ($1 \leq q \leq n/p$) of sensors gives rise on the photo detector $7q$ to the group of interference signals I5qj,2m={Iqj,11, Rqj,12, Iqj,22, Rqj,23, . . . Iqj,mm, Rqj,m(m+1)}; . . . ; and the group $5qp$ ($1 \leq q \leq n/p$) of sensors gives rise on the photo detector $7q$ to the group of interference signals I5qp,2m={Iqp,11, Rqp,12, Iqp,22, Rqp,23, . . . Iqp, mm, Rqp,m(m+1)}.

The means 1 forming the optical source also comprise calibration means. The calibration means allow the groups of emitters $S_j$ for $1 \leq j \leq p$ to be successively turned on: when the group $S_1$ of emitters is on, the other groups of emitters are off, then, the group of emitter $S_1$ is turned off and the group of emitters $S_2$ is turned on, whereas the other groups of emitters remain off, and so on. This calibration step enables to sequentially take and record the absolute time 'footprints' of each group I5qj,2m ($1 \leq j \leq p$) of interference signals resulting on photodetector $7q$ from the group $5qj$ of m sensors when the groups of optical sources S1, S2, . . . , Sj−1, Sj+1, . . . , Sp are turned off. Indeed, the p groups I5q1,2m, . . . , I5qj,2m . . . I5qp,2m of interference signals are in general not time aligned on the photo detector $7q$ (if one doesn't take care of the optical path in between two consecutive groups of sensors), and in order to achieve proper time pulse gating on the photo detector $7q$ (i.e. time demultiplexing) of the 2m interference signals $I_{qj,11}, R_{qj,12}, I_{qj,22}, R_{qj,23}, \ldots, I_{qj,kk}, R_{qj,k(k+1)}, \ldots, I_{qj,mm}$ $R_{qj,m(m+1)}$)) for each group $5qj$ (j=1 to p) of sensors, the mentioned calibration step is required.

More precisely, when the group Sj is on and all the others are off, the photo-detector $7q$ only receives the group $I5qj,2m$ of interference signals illustrated in FIG. 8d allowing the calibration means to take and register the absolute time foot prints corresponding to the particular group of sensors $5qj$.

Accordingly, during the interrogation phase (following the calibration step) that is to say when the groups of emitters $S_1$, $S_2, \ldots, S_j, \ldots, S_p$ are simultaneously on, pulse gating is achieved on photo-detector $7q$ for each group $5qj$ of sensors thanks to the absolute time footprints gathered and registered during the calibration step, allowing for a proper time demultiplexing of the interference signals from the m sensors. FIG. 8d shows the gating pulses $G_{qj,11}, G_{qj,22}, \ldots, G_{qj,mm}$ recorded during the calibration step and respectively used to properly time demultiplex the interference signals $I_{qj,11}, I_{qj,22}, \ldots, I_{qj,mm}$ from the group $5qj$ of sensors. It is shown that the lights respectively gated by $G_{qj,11}, G_{qj,22}, \ldots, G_{qj,mm}$ also contain interference signals from the other groups of sensors and born by frequencies Fk, k≠j: the demodulation at the particular frequency Fj therefore allows to isolate the signals from the sensors of group $5qj$ exclusively (Frequency Demultiplexing). In an embodiment, the carrier frequencies Fj are different one from another.

This technique makes it possible to use less photo-detectors for a given number of groups of sensors to interrogate. This technique also allows for loosely adjustable distance between any two groups of sensors (nodes).

In an alternative embodiment, there is no calibration phase and the groups $S_1, S_2, \ldots, S_j, \ldots, S_p$ are successively turned on/off during the interrogation phase of the sensors. Thus, the group $S_1$ of emitters is turned on to interrogate the groups of sensors $511, 521, \ldots 5q1, \ldots, 5(n/p)1$, then $S_1$ is turned off, and $S_2$ is turned on to interrogate the groups of sensors $512, 522, \ldots 5q2, \ldots, 5(n/p)2$ and so on, according to a similar operation to that explained above.

The advantages by the invention can be summarized in the table 1b below.

TABLE 1b

| Multiplexing techniques | Nb of multiplexed sensors/cable (1) | Nb of multiplexed sensors/PD (3) |
|---|---|---|
| TDM & WDM (D3) - prior art<br>Nb of wavelength (λ) used by the system = $n_λ$<br>Nb of TDM channels per wavelength (λ) = $n_{TDM/λ}$ | $n_λ × n_{TDM/λ}$ | $n_{TDM/λ}$ |
| WDM & FDM (D4) - prior art<br>Nb of wavelength (λ) used by the system = $n_λ$<br>Nb of FDM channels per wavelength (λ) = $n_{FDM/λ}$ | $n_λ × n_{FDM/λ}$ | $n_{FDM/λ}$ |
| TDM, WDM, FDM (invention)<br>Nb of wavelength (λ) used by the system = $n_λ$<br>Nb of TDM channels per wavelength (λ) = $n_{TDM/λ}$Nb<br>Nb of FDM channels = $n_{FDM}$ | $n_λ × n_{TDM/λ}$ | $n_{FDM} × n_{TDM/λ}$ |

The interrogation system can be efficiently shared by several sub arrays, each made up n groups of m sensors each. FIG. 10 is a schematic of a system in accordance with the present invention, increasing the multiplexing density of the system described by FIG. 6 to l sub arrays. Indeed the fiber optic coupler 11 of type p towards l has l outputs bearing the light $221, 222, \ldots, 22j, 22p$ described below.

Each sub-array $91, 92, \ldots, 9y, \ldots, 9l$ comprises n groups of m interferometric sensors, in which the m fiber optic sensors of a same node are separated by a specific distance, the n nodes of each of the l sub arrays can be spaced by any fiber length, and the distribution of the l sub arrays of the system can be any, as shown under the reference 100 in FIG. 6 for the sub-array 90.

Each sub-array $91, 92, \ldots, 9y, \ldots, 9l$ also comprises a demultiplexer similar to 40, n/p photo detectors similar to 70 followed by n/p demodulators, and arranged in a similar manner than the demultiplexer 40, the photo-detectors and the demodulators illustrated in FIG. 6 for the sub-array 90. The sub-arrays $91, 92, \ldots, 9l$ are interrogated by one single and unique means 1 described in FIG. 6.

The advantages of the system shown by FIG. 10 are similar to those of the system described by FIGS. 6, 7, 8a to 8d and 9. In addition, this system has the advantage to share the same means 1 forming optical source for the l sub-arrays, each sub-array having, however, its own demultiplexing means.

In an alternative embodiment, the l sub-arrays can be interrogated successively by sending the light coming from the means 1 forming optical source towards only one sub-array to interrogate.

The present invention is not limited to the modes of realization described above. More precisely, the fiber optic interferometric sensors can be Michelson interferometers or Fabry Perot interferometers or any interferometric means, selective in wavelength or not and allowing the proposed time multiplexing.

The invention claimed is:

1. Apparatus for multiplexing and demultiplexing Fiber Optic Interferometric Sensors (FOISs), said apparatus comprising:
  means (1) forming an optical source for providing l×n distinct trio $\{v_{qj}, F_j, \tau_j\}$ for the interferometric interrogation of l×n×m sensors, wherein the optical source comprise n optical emitters ($4qj$) organized in p groups ($S_j$) of nip optical emitters each, for providing n lights of distinct light frequencies $v_{qj}$ for $1 \leq j \leq p$ and $1 \leq q \leq n/p$ where
    $F_j$ is a RF carrier frequency generated upon the lights of the n/p emitters emitting at the frequency $v_{qj}$, and
    $\tau_j$ is a time window where the light of the nip emitters are on,
  at least one sensing cable (100) comprising n groups ($5qj$) of m fiber optic interferometric sensors ($54_{qj,k}$) each, and means ($6qj$) for dedicating a unique given trio $\{v_{qj}, F_j, \tau_j\}$ to the interrogation of a unique group ($5qj$) of m fiber optic interferometric sensors;
  at least one wavelength demultiplexing system (40) for separating the n frequencies $v_{qj}$ into nip outputs ($33_q$) containing respectively the lights of wavelength bands $B_q$ for $1 \leq q \leq n/p$, where $B_q$ contains the p wavelengths $v_{qj}$ for $1 \leq j \leq p$,
  each output ($33_q$) having at least one photo-detector ($7q$) followed by one demodulator scheme ($8q$) receiving interference signals of at least two groups ($5qj$) of m fiber optic interferometric sensors each and born by the carrier frequencies Fj for a given group ($5qj$) of sensors for $1 \leq j \leq p$;
  a calibration system for determining an absolute time footprints of the interference signals of said at least two groups ($5qj$) of m fiber optic interferometric on the qth photo-detector ($7q$).

2. Apparatus according to claim 1, in which the means forming an optical source comprise:

p wavelength multiplexers (3j), each being associated with one said group ($S_j$) of n/p optical emitters respectively;

p means (Mj) following the p wavelength multiplexers (3j) respectively, for pulsing the light of the n/p emitters (41j, 42j, ..., 4(n/p)j) of said group $S_j$ of n/p emitters during a time window $\tau_i$ and generating the RF carrier frequency Fj upon the lights of the n/p emitters (41j, 42j, ..., 4(n/p)j) of said group $S_j$, so that each of these p means (Mj) generates a couple of light pulses ($P_{ja}$, $P_{jb}$), delayed one from the other by a pulse delay $PD_j$ for $1 \leq j \leq p$.

3. Apparatus according to claim 2, in which each of the p means (Mj) generating a couple of light pulses ($P_{ja}$, $P_{jb}$) delayed one from the other by said pulse delay $PD_j$ for $1 \leq q \leq p$ consists of two Acousto Optical Modulators (AOMs) having different shift frequencies $F_{ja}$ and $F_{jb}$ and combined with two optical couplers, each Acousto Optical Modulator allowing to shift the frequency of the light that goes through it by said different shift frequencies $F_{ja}$ and $F_{jb}$ and to pulse the amplitude of the light that goes through it, to generate the light pulses ($P_{ja}$, $P_{jb}$) being time delayed by said pulse delay PDj and carrying each n/p frequencies $v_{qj}+F_{ja}$, $v_{qj}+F_{jb}$ for $1 \leq q \leq n/p$ respectively.

4. Apparatus according to claim 3, in which the means (6qj) for dedicating a unique given trio $\{v_{qj}, F_j, \tau_j\}$ to the interrogation of a unique group (5qj) of m fiber optic interferometric sensors ($54_{qj,k}$) are means for dropping the light frequencies $v_{qj}$ to a respective group (5qj) of sensors, and passing the other remaining light frequencies.

5. Apparatus according to claim 2 or 3, in which each group (5qj) of m fiber optic interferometric sensors comprises m first fiber optic couplers ($E_{qj,k}$) of type one input towards two first and second outputs disposed in series along a main fiber ($FO_{qj}$), of which the first output is coupled to a respective fiber optic interferometric sensor ($54_{qj,k}$).

6. Apparatus according to claim 5, in which the means (6qj) for dedicating a unique given trio $\{v_{qj}, F_j, \tau_j\}$ to the interrogation of a unique group (5qj) of m fiber optic interferometric sensors ($54_{qk,k}$) are means for dropping the light frequencies $v_{qj}$ to a respective group (5qj) of sensors, and passing the other remaining light frequencies.

7. Apparatus according to claim 5, in which the first fiber optic couplers ($E_{qj,k}$) are spaced one from another by fiber optic sections of identical length so that the round trip path imbalance between two successive first fiber optic couplers ($E_{qj,k}$) along the main fiber ($FO_{jq}$) is identical and equals a value D".

8. Apparatus according to claim 7, in which the means (6qj) for dedicating a unique given trio $\{v_{qj}, F_j, \tau_j\}$ to the interrogation of a unique group (5qj) of m fiber optic interferometric sensors ($54_{qj,k}$) are means for dropping the light frequencies $v_{qj}$ to a respective group (5qj) of sensors, and passing the other remaining light frequencies.

9. Apparatus according to claim 7, in which each fiber optic interferometric sensor ($54_{qj,k}$) comprises a second fiber optic coupler ($F_{qj,k}$) of type one input towards two first and second outputs, which input is connected to said first output of said first respective fiber optic coupler ($E_{qj,k}$) of the main fiber ($FO_{qj}$), the first output of the second fiber optic coupler ($F_{qj,k}$) being ended by a first mirror ($54_{qj,sk}$) and the second output of the second fiber optic coupler ($F_{qj,k}$) being ended by a second mirror ($54_{qj,lk}$), a fiber optic portion comprising a compliant body ($540_{qj,k}$) being provided between the second output of the second fiber optic coupler ($F_{qj,k}$) and the second mirror ($54_{qk,lk}$).

10. Apparatus according to claim 7, in which two first successive fiber optic couplers ($E_{qj,k}$) are arranged along the main fiber ($FO_{qj}$) in such a way that the round trip path imbalance D" corresponds to a time delay t(D") close to twice said pulse delay PDj.

11. Apparatus according to claim 10, in which each fiber optic interferometric sensor ($54_{qj,k}$) comprises a second fiber optic coupler ($F_{qj,k}$) of type one input towards two first and second outputs, which input is connected to said first output of said first respective fiber optic coupler ($E_{qj,k}$) of the main fiber ($FO_{qj}$), the first output of the second fiber optic coupler ($F_{qj,k}$) being ended by a first mirror ($54_{qj,sk}$) and the second output of the second fiber optic coupler ($F_{qj,k}$) being ended by a second mirror ($54_{qj,lk}$), a fiber optic portion comprising a compliant body ($540_{qj,k}$) being provided between the second output of the second fiber optic coupler ($F_{qj,k}$) and the second mirror ($54_{qj,lk}$).

12. Apparatus according to claim 10, in which the means (6qj) for dedicating a unique given trio $\{v_{qj}, F_j, \tau_j\}$ to the interrogation of a unique group (5qj) of m fiber optic interferometric sensors ($54_{qj,k}$) are means for dropping the light frequencies $v_{qj}$ to a respective group (5qj) of sensors, and passing the other remaining light frequencies.

13. Apparatus according to claim 7, in which two first successive fiber optic couplers ($E_{qj,k}$) are arranged along the main fiber ($FO_{qj}$) in such a way that the round trip path imbalance D" corresponds to a time delay t(D") close to said pulse delay PDj.

14. Apparatus according to claim 13, in which each fiber optic interferometric sensor ($54_{qj,sk}$) comprises a second fiber optic coupler ($F_{qj,k}$) of type one input towards two first and second outputs, which input is connected to said first output of said first respective fiber optic coupler ($E_{qj,k}$) of the main fiber ($FO_{qj}$), the first output of the second fiber optic coupler ($F_{qj,k}$) being ended by a first mirror ($54_{qj,sk}$) and the second output of the second fiber optic coupler ($F_{qj,k}$) being ended by a second mirror ($54_{qj,lk}$), a fiber optic portion comprising a compliant body ($540_{qj,k}$) being provided between the second output of the second fiber optic coupler ($F_{qj,k}$) and the second mirror ($54_{qj,lk}$).

15. Apparatus according to claim 13, in which the means (6qj) for dedicating a unique given trio $\{v_{qj}, F_j, \tau_j\}$ to the interrogation of a unique group (5qj) of m fiber optic interferometric sensors ($54_{qj,k}$) are means for dropping the light frequencies $v_{qj}$ to a respective group (5qj) of sensors, and passing the other remaining light frequencies.

16. Apparatus according to claim 5, in which each fiber optic interferometric sensor ($54_{qj,k}$) comprises a second fiber optic coupler ($F_{qj,k}$) of type one input towards two first and second outputs, which input is connected to said first output of said first respective fiber optic coupler ($E_{qj,k}$) of the main fiber ($FO_{qj}$), the first output of the second fiber optic coupler ($F_{qj,k}$) being ended by a first mirror ($54_{qj,sk}$) and the second output of the second fiber optic coupler ($F_{qj,k}$) being ended by a second mirror ($54_{qj,lk}$), a fiber optic portion comprising a compliant body ($540_{qj,k}$) being provided between the second output of the second fiber optic coupler ($F_{qj,k}$) and the second mirror ($54_{qj,lk}$).

17. Apparatus according to claim 16, in which for each group (5qj) of m fiber optic interferometric sensors, a short optical arm of each of the m sensors corresponds to an optical path between the input of the second fiber optic coupler ($F_{qj,k}$) and the first mirror ($54_{qj,sk}$), and a long optical arm associated with each of the m sensors corresponds to an optical path between the input of the second fiber optic coupler ($F_{qj,k}$) and the second mirror ($54_{qj,sk}$), the round trip path imbalance between the short and long optical arms being equal to a value D' and corresponds to a time delay t(D') very close to the pulse delay PDj.

18. Apparatus according to claim 17, in which the round trip path imbalance between the short and long optical arms of at least one fiber optic interferometric sensor ($54_{qj,k}$) is generated by the compliant body ($540_{qj,k}$) of the sensor itself.

19. Apparatus according to claim 18, in which each of the 2*m mirrors ($54_{qj,lk}$, $54_{qj,sk}$) of one group ($5qj$) of fiber optic interferometric sensors dedicated to said unique given trio $\{v_{qj}, F_j, \tau_j\}$ is a Fiber Bragg Grating selectively reflecting the light frequency $v_{qj}$.

20. Apparatus according to claim 18, in which the means ($6qj$) for dedicating a unique given trio $\{v_0, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

21. Apparatus according to claim 17, in which each of the 2*m mirrors ($54_{qj,lk}$, $54_{qj,sk}$) of one group ($5qj$) of fiber optic interferometric sensors dedicated to said unique given trio $\{v_{qj}, F_j, \tau_j\}$ is a Fiber Bragg Grating selectively reflecting the light frequency $v_{qj}$.

22. Apparatus according to claim 17, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

23. Apparatus according to claim 16, in which each of the 2*m mirrors ($54_{qj,lk}$, $54_{qj,sk}$) of one group ($5qj$) of fiber optic interferometric sensors dedicated to said unique given trio $\{v_{qj}, F_j, \tau_j\}$ is a Fiber Bragg Grating selectively reflecting the light frequency $v_{qj}$.

24. Apparatus according to claim 23, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

25. Apparatus according to claim 16, in which each of the 2*m mirrors ($54_{qj,lk}$, $54_{qj,sk}$) of one group ($5qj$) of fiber optic interferometric sensors dedicated to said unique given trio $\{v_{qj}, F_j, \tau_j\}$ are not selective in wavelength, and are gold mirrors for example.

26. Apparatus according to claim 25, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

27. Apparatus according to claim 16, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

28. Apparatus according to claim 1, in which the fiber optic interferometers forming the sensors are Michelson interferometers or Fabry-Perot interferometers.

29. Apparatus according to claim 28, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

30. Apparatus according to claim 1, which apparatus is capable of interrogating 1 sub arrays ($9r$), each made up of said n groups ($5qj$) of m fiber optic interferometric sensors ($54_{qj,k}$) and coupled by an optical coupling means to the means (1) forming the optical source.

31. Apparatus according to claim 30, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

32. Apparatus according to claim 1, in which the means forming the optical source also comprise means for successively switching on/off said p groups ($S_j$) of n/p optical emitters.

33. Apparatus according to claim 32, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

34. Apparatus according to claim 1 or 2, in which the means ($6qj$) for dedicating a unique given trio $\{v_{qj}, F_j, \tau_j\}$ to the interrogation of a unique group ($5qj$) of m fiber optic interferometric sensors ($54_{qj,k}$) are means for dropping the light frequencies $v_{qj}$ to a respective group ($5qj$) of sensors, and passing the other remaining light frequencies.

35. Apparatus according to claim 34, in which the dropping means ($6qj$) are distributed along a fiber and spaced one from another by fiber optic sections of any length.

* * * * *

UNITED STATES PATENT AND TRADEMARK OFFICE
CERTIFICATE OF CORRECTION

| | | |
|---|---|---|
| PATENT NO. | : 8,189,200 B2 | Page 1 of 1 |
| APPLICATION NO. | : 12/476568 | |
| DATED | : May 29, 2012 | |
| INVENTOR(S) | : Sylvie Menezo et al. | |

It is certified that error appears in the above-identified patent and that said Letters Patent is hereby corrected as shown below:

IN THE CLAIMS

Column 16, Claim 1, line 39, please replace "nip" with -- n/p --.

Column 16, Claim 1, line 44, please replace "nip" with -- n/p --.

Column 16, Claim 1, line 52, please replace "nip" with -- n/p --.

Column 17, Claim 3, line 15, please replace "$1 \leqq q \leqq p$" with -- $1 \leq j \leq p$ --.

Signed and Sealed this
Twenty-third Day of October, 2012

David J. Kappos
*Director of the United States Patent and Trademark Office*